(12) United States Patent
Young et al.

(10) Patent No.: US 10,536,073 B2
(45) Date of Patent: Jan. 14, 2020

(54) POWER FACTOR CORRECTION STAGES IN POWER CONVERSION

(71) Applicant: Icergi Limited, Dublin (IE)

(72) Inventors: George Young, Dublin (IE); Trong Tue Vu, Dublin (IE)

(73) Assignee: Icergi Limited, Dublin (IE)

( * ) Notice: Subject to any disclaimer, the term of this patent is extended or adjusted under 35 U.S.C. 154(b) by 0 days.

(21) Appl. No.: 15/500,858

(22) PCT Filed: Aug. 3, 2015

(86) PCT No.: PCT/EP2015/067863
§ 371 (c)(1),
(2) Date: Jan. 31, 2017

(87) PCT Pub. No.: WO2016/016475
PCT Pub. Date: Feb. 4, 2016

(65) Prior Publication Data
US 2017/0237339 A1    Aug. 17, 2017

(30) Foreign Application Priority Data
Aug. 1, 2014    (GB) .................................. 1413726.9

(51) Int. Cl.
*H02M 1/38* (2007.01)
*H02M 1/42* (2007.01)
(Continued)

(52) U.S. Cl.
CPC ........... *H02M 1/4225* (2013.01); *H02M 1/38* (2013.01); *H02M 7/10* (2013.01); *H02M 7/19* (2013.01); *H02M 2001/0054* (2013.01)

(58) Field of Classification Search
CPC ........ H02M 1/12; H02M 1/42; H02M 1/4225; H02M 1/4233; H02M 1/4241;
(Continued)

(56) References Cited

U.S. PATENT DOCUMENTS

| | | | |
|---|---|---|---|
| 2005/0111246 A1* | 5/2005 | Lai ......................... | H02M 5/225 363/157 |
| 2011/0044077 A1* | 2/2011 | Nielsen ................... | H02J 9/062 363/37 |

(Continued)

FOREIGN PATENT DOCUMENTS

| | | |
|---|---|---|
| EP | 2515420 A2 | 10/2012 |
| GB | 2452318 | 3/2009 |

(Continued)

OTHER PUBLICATIONS

Jin, et al., "A new control approach for unity power factor multilevel rectifiers", "2004 IEEE Applied Power Electronics Conference and Exposition, APEC 04, IEEE, Anaheim, CA, USA", Feb. 22, 2004, pp. 1475-1480.

(Continued)

*Primary Examiner* — Nguyen Tran
*Assistant Examiner* — Bryan R Perez
(74) *Attorney, Agent, or Firm* — Charles A. Lemaire; Jonathan M. Rixen; Lemaire Patent Law Firm, P.L.L.C.

(57) ABSTRACT

The present application relates to switching power supplies and in particular to AC to DC switch mode power supplies, to methods of power factor correction for same and to devices and circuits that may be used generally in same. The application describes a number of multi-level approaches and circuits.

23 Claims, 28 Drawing Sheets

(51) Int. Cl.
*H02M 7/10* (2006.01)
*H02M 7/19* (2006.01)
*H02M 1/00* (2006.01)

(58) Field of Classification Search
CPC ...... H02M 1/4258; H02M 1/425; H02M 1/42; H02M 5/40; H02M 5/42; H02M 5/44; H02M 5/443; H02M 5/45; H02M 5/4505; H02M 5/451; H02M 5/452; H02M 5/458; H02M 5/4585
See application file for complete search history.

(56) References Cited

U.S. PATENT DOCUMENTS

| | | | | |
|---|---|---|---|---|
| 2011/0109283 A1* | 5/2011 | Kapels | ................ | H02M 3/1588 323/235 |
| 2011/0260700 A1* | 10/2011 | Chen | ................... | H02M 1/4233 323/207 |
| 2012/0229100 A1* | 9/2012 | Trenchs | ................... | H02M 1/36 320/166 |
| 2014/0145693 A1* | 5/2014 | Lee | ......................... | H02M 1/00 323/271 |
| 2015/0200602 A1* | 7/2015 | Narimani | ............ | H02M 5/4585 363/37 |
| 2017/0055322 A1* | 2/2017 | Jiang | ....................... | H02M 3/07 |

FOREIGN PATENT DOCUMENTS

| WO | WO_2014013663 A1 | 1/2014 |
|---|---|---|
| WO | WO_2014140352 A1 | 9/2014 |
| WO | WO_2015136097 | 9/2015 |

OTHER PUBLICATIONS

Keyhani, et al., "Flying-capacitor boost converter", "Applied Power Electronics Conference and Exposition (APEC), 2012 Twenty-Seventh Annual IEEE, IEEE", Feb. 5, 2012, pp. 2311-2318.

* cited by examiner

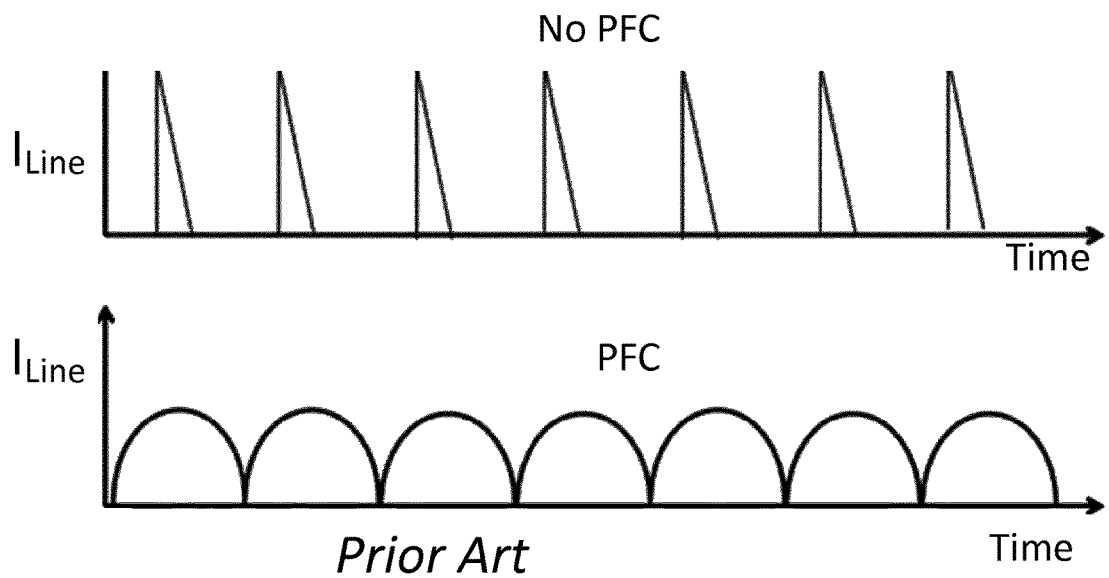
Fig. 1A
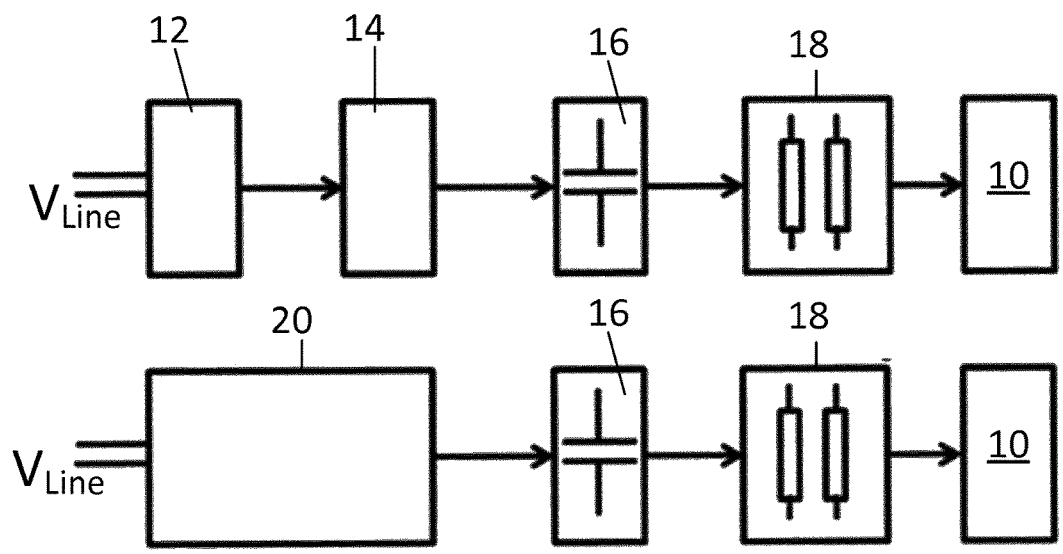
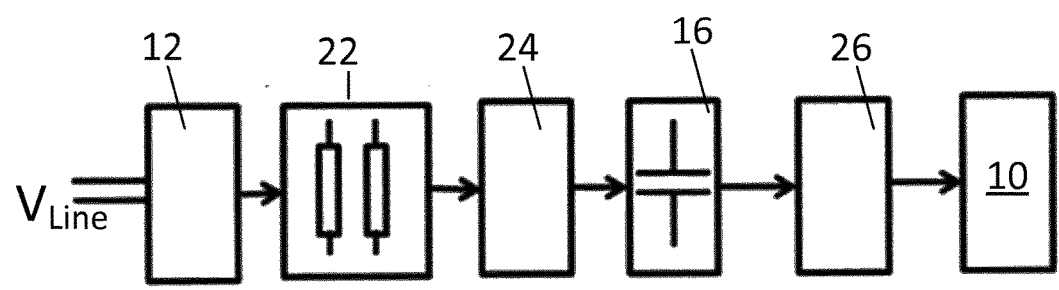
Fig. 1B

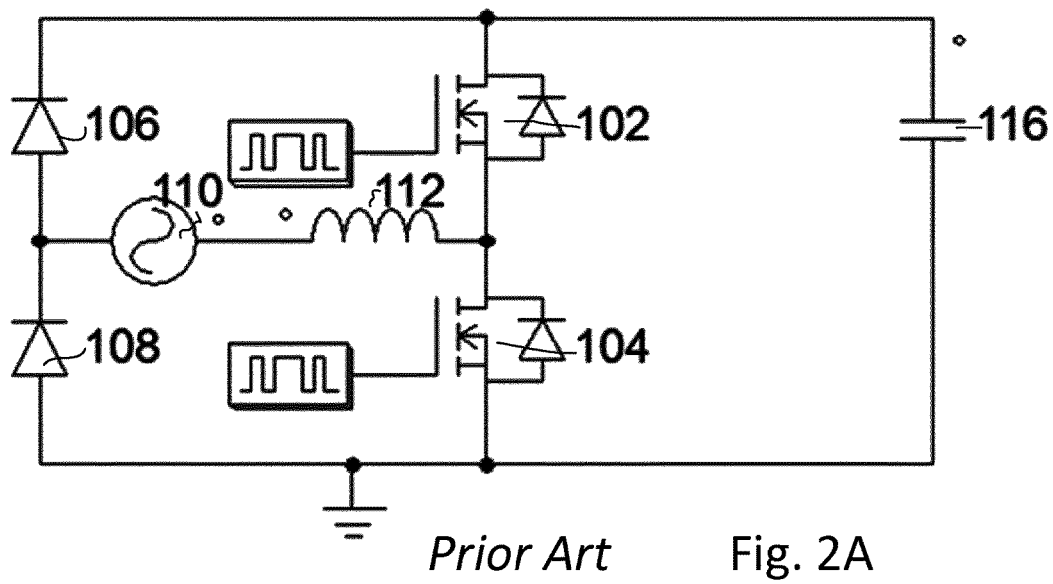
Prior Art    Fig. 2A
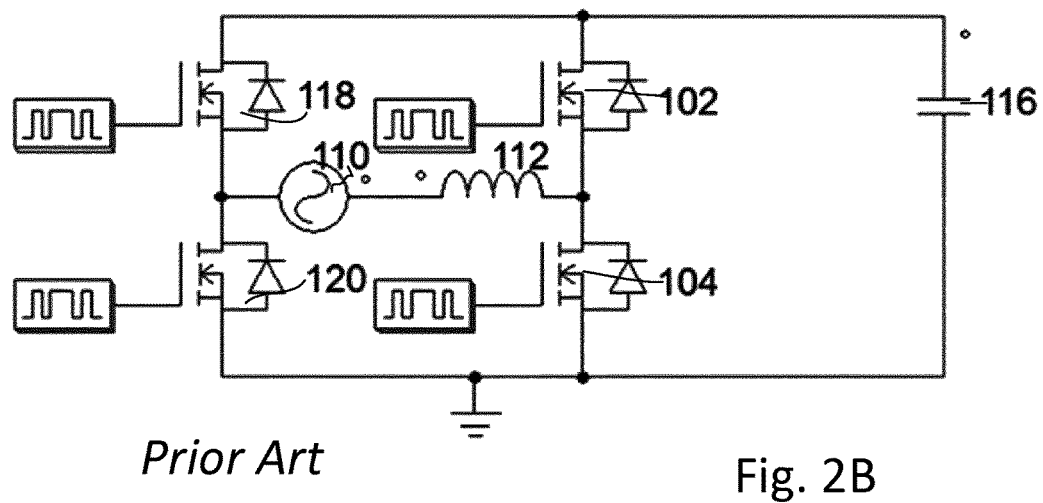
Prior Art    Fig. 2B

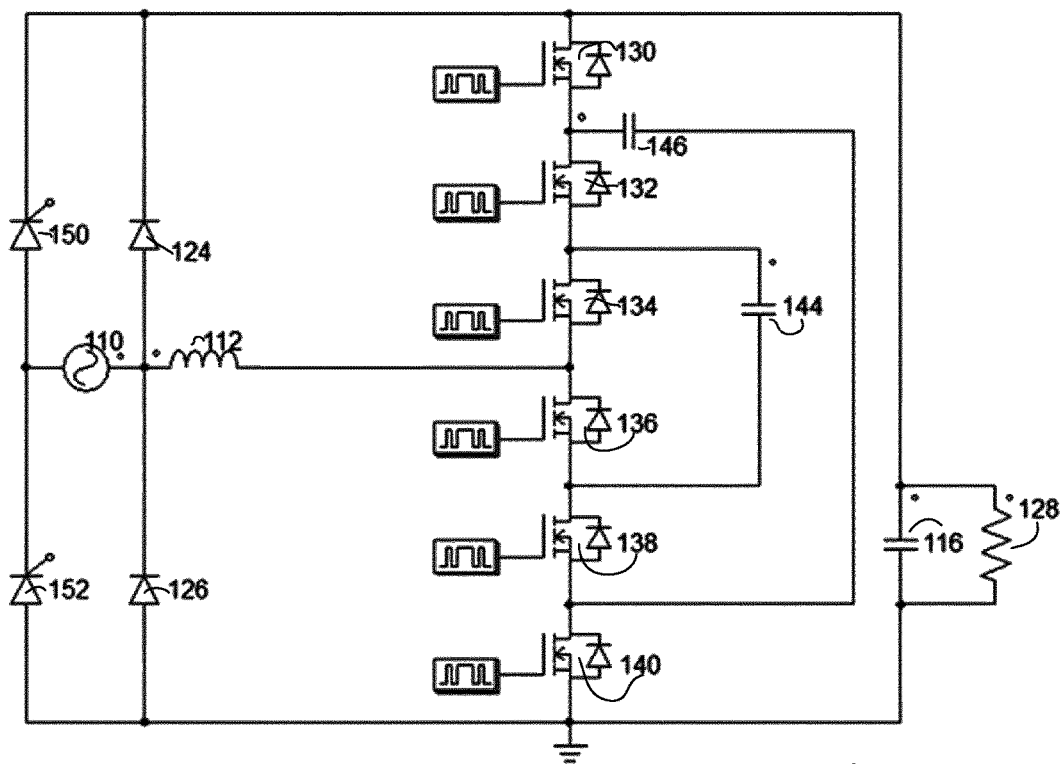
Fig. 4A
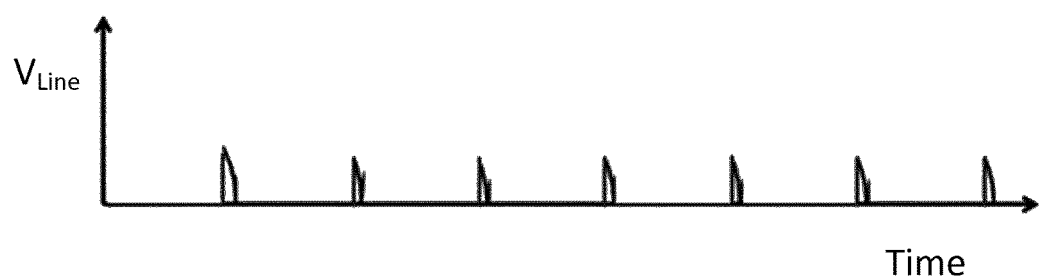
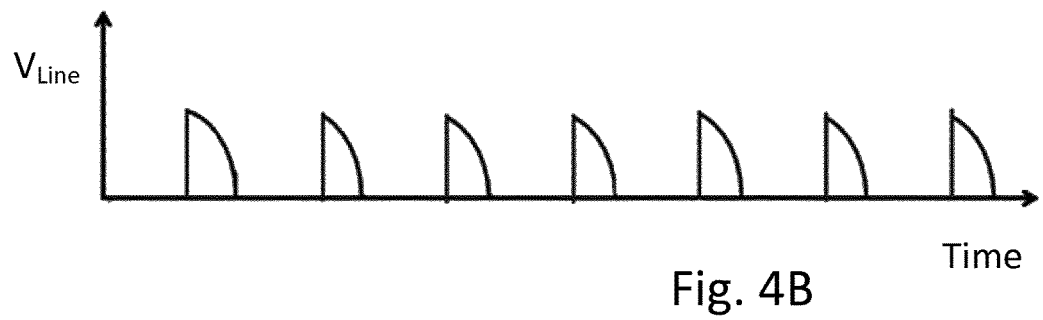
Fig. 4B

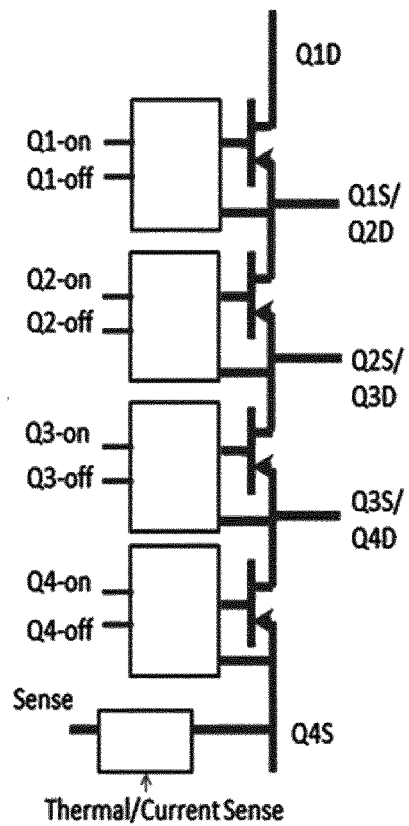
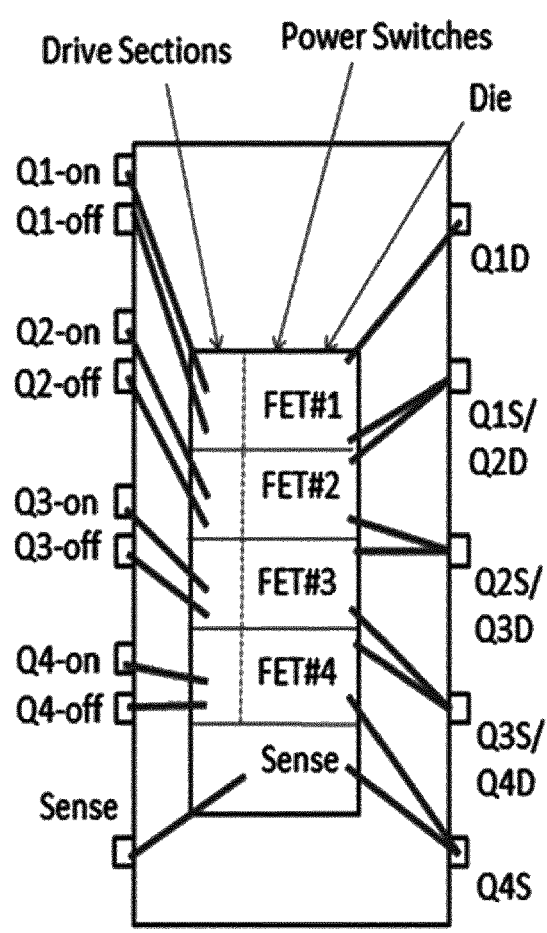
Fig. 21A
Fig. 21B

POWER FACTOR CORRECTION STAGES IN POWER CONVERSION

RELATED APPLICATIONS

The present application is a national-stage filing of, and claims priority benefit of, PCT Patent Application No. PCT/EP2015/067863, filed Aug. 3, 2015, which claims priority from UK Patent Application No. GB 1413726.9, filed 1 Aug. 2014, the entire contents of which are incorporated herein by reference. The present application also draws on prior filings by the inventor, including PCT/EP2014/055214, PCT/EP2014/055212, PCT/EP2014/055215 and PCT/EP2014/055213 the entire contents of which are herein incorporated by reference and which may be combined with the teaching herein to allow optimisation of converter performance.

FIELD OF THE APPLICATION

The present application relates to switching power supplies and in particular to AC to DC switch mode power supplies, to methods of power factor correction for same and to devices and circuits that may be used generally in same.

BACKGROUND

A requirement increasingly imposed on power converters fed by utility supplies is that the Power Factor exceed a lower limit, typically 0.9. This implies that the voltage supplied and current drawn are substantially in-phase with sinusoidal current, resulting as shown by the sinusoidal rectified line current in the lower part of FIG. 1(a) where there is power factor correction. In contrast the upper part illustrates what the rectified line current might typically look like without power factor correction. As a result, Power Factor Correction ("PFC") is becoming a key functional requirement of power converters.

It will be appreciated that there are a variety of different architectural approaches to PFC. Some of these architectural options for power factor correction are as shown in the three general options of FIG. 1(b). The nature of each of these options will be understood by those skilled in the art. Each of the options takes a line (mains) voltage ($V_{Line}$) and converts it through a series of stages to provide power to a load 10. In the first option, the line voltage is rectified through a rectification stage 12. The rectified voltage from the rectification stage acts as an input to a pre-regulator stage 14, which in turn charges a bulk capacitance 16. A high frequency transformer stage 18 is then provided to convert the voltage on the bulk capacitance to the desired voltage for the load 10. It will be appreciated that the high frequency transformer section also isolates the mains side from the low voltage DC side on the output. It will be appreciated that high-frequency is relative to the incoming main frequency of 50 Hz and may for example be of the order of 10-20 kHz.

In the second option, the rectification and pre-regulator functions are combined together in stage 20. This type of arrangement is generally referred to as a "Bridgeless" approach. In the third approach, which is a bus converter approach, the line voltage is rectified by a rectifier stage 12 before being switched by a high frequency transformer stage (bus converter) 22, which is followed by a pre-regulator stage 24, bulk capacitance and then a post-regulator stage 26.

There is of course the opportunity for successive functional blocks to be integrated to perform multiple roles, which may be attractive in terms of reducing cost particularly at lower power levels. For example a single stage may perform both isolation and power factor correction.

As shown, Power Factor Correction is typically implemented by a boost pre-regulator 20, or in some cases by modifying a flyback topology to widen the conduction angle to meet norms. The buck pre-regulator can also have application in some roles, but has the significant disadvantage of only drawing current when the input voltage is above the output voltage of the buck stage.

The operating conditions of the power factor correction functional block vary significantly. Typically an input range of 90V root-mean-square ("RMS") to 264V RMS is required. Within a sinusoidal line cycle, the instantaneous power handled at the peak is twice the RMS power, thus imposing further variability on circuit operation.

The conventional design approach taken when designing a converter is associated with removing this variability as early as possible in the conversion stage, such that a small number of stages, indeed generally just one, has to deal with the variability in operating conditions, and "downstream" stages can work under the near constant operating conditions associated with high efficiency.

The input stage of a power converter also has challenges in terms of managing surges, where high voltages can be applied to the line for several tens of microseconds, in terms of managing inrush currents to a large electrolytic capacitor as used in boost power factor correction circuits and in managing noise that may be transferred to the AC line. The typical approach also uses a bridge rectifier, with the attendant voltage drop of approximately 1.2V-1.6V that accounts for loss of typically 1.5% at low line.

A particular challenge in the context of improving power density in power converters fed from the AC line relates to the switching frequency of the power factor correction stage. This stage operates necessarily from line voltage under the wide range of operating conditions as discussed, and the "conventional" stages are challenged in terms of implementing soft-switching as needed for high efficiency.

Some boundary-mode operation holds potential—but this is difficult to manage across the full range of operating conditions. Gallium Nitride devices are associated with lower parasitics in terms of capacitance for given switch on-resistance, and such devices can be used in converters for power factor correction at higher frequencies. The potential attractions of efficient high-frequency operation include significant reduction of magnetic elements in the main converter stage, as well as reduction of size of magnetics and capacitance in the EMI filter.

The present application is directed to techniques which assist in getting to this position—i.e. having small passive components consistent with high efficiency in implementing power factor correction.

SUMMARY

The present application is focused on the overall design of power conversion circuitry having power factor correction functionality and presents a number of different aspects. This approach involves the correct choice of architecture, the appropriate characteristics and design of "downstream" circuitry, and aspects of physical implementation in circuit blocks or modular cells. Whilst the present application is directed to an overall design, it will be appreciated that the different aspects may be used on their own in different power conversion circuitry to advantage.

One goal to the overall design relates to size minimisation. This has implications throughout the design process. As a result, the efficiency needs to be maintained at a high level over varying conditions of line and load consistent with deployment of small passive elements. As a result, the design has sub goals in this context including the minimisation of the size of input inductor and filtering elements and to limiting the size of bulk capacitance. This latter aspect has particular consequences for design of the "downstream" circuitry. A novel presented "Stacked Multiphase Asymmetrical Half Bridge" topology is particularly well suited for usage in this "downstream" circuitry.

The various aspects of the application are set forth in the independent claims which follow. Advantageous and alternative features are set forth in the dependent claims. It will be appreciated that as the various aspects are directed to a single overall converter design that the subject matter of each may be taken to be combinable with each other aspect individually or in combination with other aspects and such combinations are envisaged.

It will be understood from the description which follows that the present application provides a number of distinct improvements over the art. It will be appreciated that any of these improvements may be employed with any of the other improvements unless otherwise dictated, for example where the improvements are directed to different circuits performing the same function.

More specifically, the present application provided a number of improvements as provided for in the claims which follow.

DESCRIPTION OF DRAWINGS

The present application will be better understood with reference to the accompanying drawings in which:

FIG. 1a illustrates exemplary rectified line current waveforms associated with a AC-DC converter without and with power factor correction as known in the prior art, with the top part showing a rectified line current without power factor correction (No PFC) and a bottom part showing a rectified line current with power factor correction (PFC);

FIG. 1b illustrates generally known approaches to incorporating PFC correction into an AC-DC switching converter;

FIG. 2a is an exemplary "bridgeless totem pole" arrangement known in the art using diode rectification;

FIG. 2b corresponds to the arrangement to FIG. 2a in which diode rectifiers have been replaced with synchronous rectifiers;

FIG. 4A is a modification of the arrangement of FIG. 3 in which diode rectifiers have been replaced with thyristors;

FIG. 4B illustrates phase control waveforms that may be employed with the modified arrangement of FIG. 4A, with the top part illustrating a rectified line voltage with high (initial) clipping and the bottom part illustrating a rectified line voltage with moderate clipping, where clipping is effected by the thyristors in FIG. 4A;

FIG. 21A is a further series arrangement of power switching transistors suitable for use in a switching power supply, where each transistor is responsive through an associated driver to an ON signal path to turn on and an OFF signal path to turn off which is suitable for implementation in an integrated circuit in combination with the corresponding driver circuits with a representation in FIG. 21B of an exemplary resulting packaged IC of the series arrangement and driver circuits.

DETAILED DESCRIPTION

Figure 3:
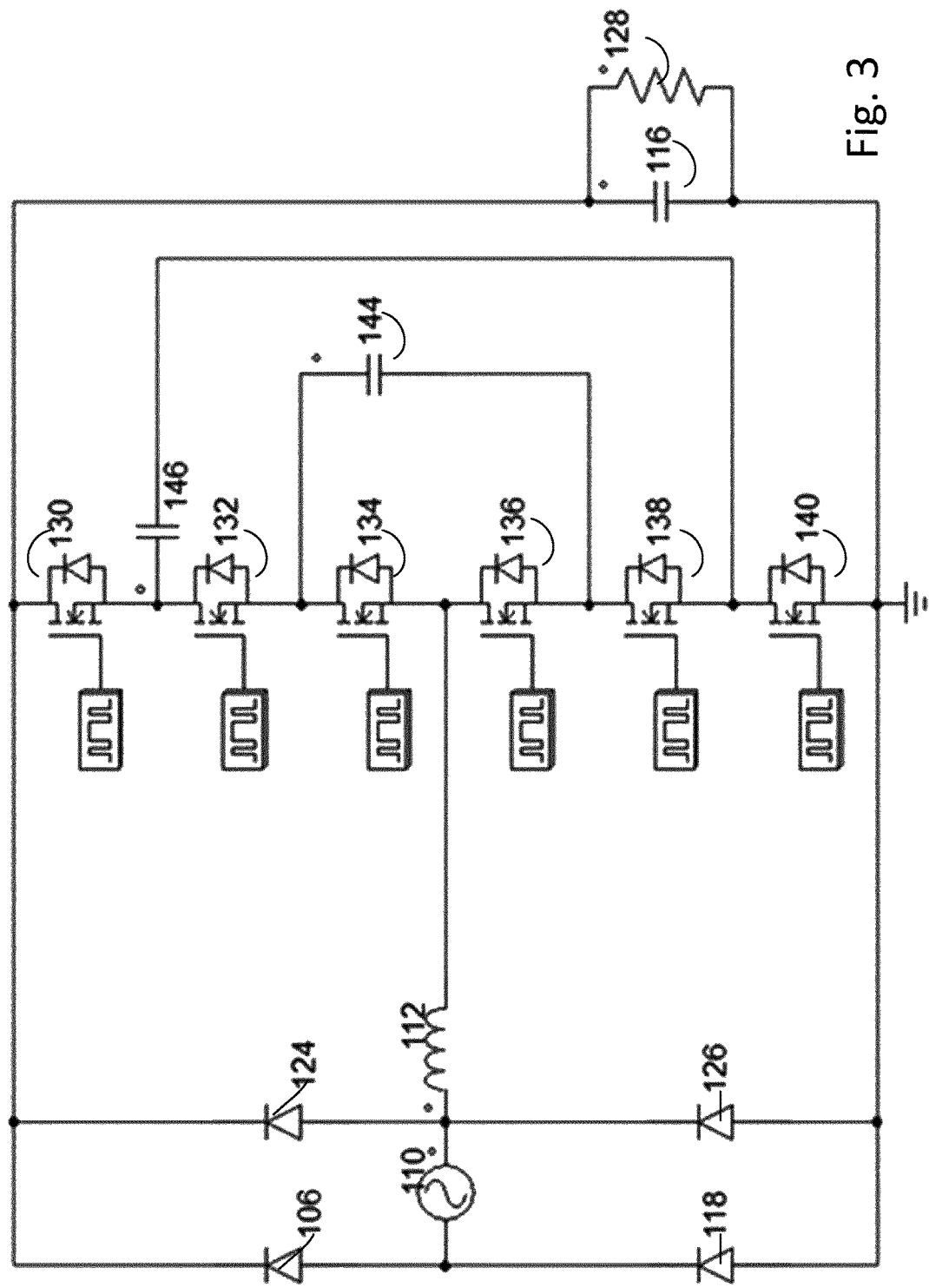
FIG. 3 is a multi-level bridgeless totem pole arrangement according to a first aspect of the present application.

Enhancements to power factor correction approaches may be considered essentially in two categories—(a) by using a modified boost-stage topology implementing primary-side current shaping with a primary-side "bulk" capacitor, also including enhancements to reduce the size of this bulk capacitor or (b) by implementing a "dual-ratio bus converter" ("DRBC") approach with secondary-side current shaping.

(a) Primary-Side Boost Stage Enhancement

As will be familiar to those skilled in the art, one known boost topology in the context of transistor switching (e.g. GaN) devices is the "bridgeless totem pole" converter. An example of such a bridgeless totem pole converter using diode rectifiers is as shown in FIG. 2A with FIG. 2B employing synchronous rectifiers.

As will be familiar to those skilled in the art, the approach in the bridgeless totem pole is that in one half line-cycle, current flows from the line input 110 through inductor 112, with switch 104 operating as a boost switch and the reverse conduction characteristics of switch 102 serve as a rectifier feeding bulk capacitor 116. It will be appreciated by those skilled in the art that switch 102 (and indeed other switches in the figures) is represented as a MOS type transistor having a body diode in parallel. In the opposing line half-cycle, where the "quiet" end of the AC line is clamped at the higher voltage rail, then switch 102 operates in the normal switching mode associated with a boost converter and the reverse conduction of switch 104 serves as the rectifier. Diodes 106 and 108 allow for current flow and may be replaced with line-frequency switched synchronous rectifiers 118 and 120, as shown in FIG. 2(b), if efficiency requirements dictate and if inrush and surge management considerations permit.

In the case of certain types of switching devices, for example such as those devices made with GaN without reverse recovery issues, then such an approach can give an elegant solution. In the case of silicon devices, the reverse recovery issues may be significant. These can be addressed in part using a composite device, for example as described in one of the previously referenced applications by the same inventor. Nonetheless, there remains the issue of hard switching at high voltage with associated capacitive losses. An approach as proposed in one of the previously referenced applications by the present inventor can provide zero-voltage switching. Whilst this approach has proved highly effective, test implementations have identified that effectiveness is reduced at higher switching frequencies, e.g. above several hundred kilohertz, due to magnetics losses associated with the requisite flux transitions. In particular, switching losses for transistors having a high operating voltage become significant as switching frequencies increase.

Accordingly, a first aspect of the present application is directed at improving the performance at higher frequencies, for example at effective switching frequencies above 300 kHz. This first aspect of switching converter is claimed generally in independent claim 1 and its dependent claims which follow. It will be appreciated that whilst such an aspect may be advantageous over the art at operating at such frequencies it is not necessarily restricted to operation at same and may be used at lower frequencies.

This first aspect of the present application provides a solution by replacing the two-device "totem-pole" leg in the bridgeless totem pole with a multilevel converter stage to achieve a materially enhanced performance. This may be implemented using flying capacitors as shown in FIG. 3. Alternatively, in place of the flying capacitor arrangement a series arrangement of capacitors connected across the output nodes may be employed in which the nodes between the capacitors are connected to corresponding nodes in a series of switches by means of a blocking diode. The general approach of this first aspect of the present application will now be explained with reference to the switching converter comprising a multi-level structure as shown in FIG. 3.

It will be appreciated that the arrangement of FIG. 3 corresponds generally to the arrangement of FIG. 2A with switches 102 and 104 being replaced by the multi-level structure comprising switches 130, 132, 134, 136, 138 and 140 and flying capacitors 144, 146. Diode rectifiers 124, 126 are provided as bypass devices to allow an alternative path to the capacitor 116 on start-up.

More particularly, the structure comprises a bridgeless totem pole arrangement having two input nodes across which the mains voltage 110 is provided as an input. The arrangement comprises a first rectifier 106 which is provided in a forward direction between a first of the input nodes and a first output node. The first output node is also connected to a first end of a multilevel structure, a first side of an output capacitor 116 from the conversion stage and to a first side of load 126.

A second rectifier 118 is provided in a reverse direction from the first input node to a second output node. The second of the output nodes is connected to the second side of the output capacitor 116 and to a second side of the load 126. The second output node is also connected to the second end of the multi-level structure.

A first side of an inductor 112 is connected to the second input node. The second side of the inductor 112 is connected to an input node of the multi-level structure. Bypass rectifiers 124, 126 are provided between the second input node and the output nodes to allow inrush current to the capacitor 116.

In the exemplary arrangement shown, the multi-level structure comprises a plurality of paired switches arranged in series between the first and second output nodes. The first switch 130 is paired with the last switch 140 in the series. The second switch 132 is paired with the second last switch 138. In the exemplary arrangement of FIG. 3, where there are three pairs, the third switch 134 is paired with the third last switch 136. Each arrangement of paired switches is operated in a complementary fashion, i.e. when one switch of the pair is ON the other switch is OFF. It will be appreciated that in the present application complementary also includes a situation where both switches off.

At least one flying capacitor, and in the exemplary arrangement two, is connected between intermediate nodes of the series of switches. Thus for example, a first flying capacitor is connected at a first side to the common node between the first switch 130 and second switch. The second side of the first flying capacitor is connected to the common node between the last switch 140 and second last switch 138. An advantage of using the multi-level structure is that the inductor ripple currents are materially reduced and so EMI filtering requirements are reduced. Additionally, because the switches in the multi-level switching structure are connected in series, the required operating voltage is reduced from a conventional totem pole arrangement. Thus in the case of FIG. 3, where there are 6 switches the voltage required for the switches is effectively reduced by a factor of 3. Thus the operating voltage of the switches (transistors) may be selected to be less than 400 volts and suitably less than 250 volts. A benefit of this is that more efficient switches (improved reverse recovery characteristics) can be selected which may operate at higher frequencies in each stage than higher voltage switches, as well as which the effective frequency of operate is increased by the number of stages present. At the same time the size of the inductor may be reduced vis a vis comparable designs. A suitable modulation scheme involves operating each of switches 130, 132 and 134 with the relevant duty cycle appropriate to controlling the current in inductor 112, but separating the phases by 120 degrees. More generally, in a converter with $2n$ devices, each switch in the top leg can operate with a phase shift of $360/n$ degrees. Such a modulation scheme is aligned with the goals of minimising the amplitude of ripple current in inductor 112 and in increasing the fundamental frequency of the ripple component to n times the switching frequency of each device. The lower leg switches are then driven in a complementary fashion as per the rules from the previous paragraph.

Similarly, a first node of a second flying capacitor is connected at a first side to the common node between the second switch 132 and third switch 134. The second side of the second flying capacitor is connected to the common node between the second last switch 138 and third last switch 136.

In (steady state) operation, the flying capacitors have quasi-fixed voltages. For example, the voltage across the first flying capacitor 146 is nominally 0.67 times the output voltage across the output (bulk) capacitor 116 and load 128. Whereas the voltage across the second flying capacitor 144 is nominally 0.33 times the output voltage.

To achieve this switching action requires generally complementary operation of switch pairs, for example 130 being driven in a complementary fashion with respect to 140. Similarly, 132 is driven in a complementary fashion to 138 and 134 is driven in a complimentary fashion to 136. An equal phase-shifted modulation pattern (120 degree spacing in this exemplary instance) can result in balanced operation such that the worst case peak-peak inductor (112) ripple current is reduced by a factor of 3 and also the fundamental frequency of the ripple component increases by a factor of 3. The net result of which is that there is a significant reduction in the cost of the boost inductor as compared with more conventional approaches.

Whilst soft-switching approaches as proposed for multi-level inverter legs may be considered here, their usage with bidirectional power flow—different on each line half-cycle—involves complexity. The lower voltages involved in each switching stage reduce capacitance-related losses materially, and reverse recovery characteristics of devices with lower voltage ratings are typically significantly better than in the case of devices rated at higher voltages, thus allowing any required hard-switching transitions to be implemented with minimal loss penalty. As previously stated, diodes 124 and 126 are bypass diodes to avoid current stresses in the switching components under inrush or fault conditions.

It will be appreciated by those skilled in the art that there may be some practical issues relating to the requirement to generally pre-charge the flying capacitors and to driver approaches.

For example, it will be appreciated that on initial start-up, the flying capacitors 144 and 146 are usually to be found in a discharged condition, having been clamped generally by the discharged electrolytic capacitor 116.

On sudden commencement of switching, it may be difficult to ensure that devices operate within normal ratings accordingly there may be some reliance on avalanche energy ratings.

In many cases, this is quite acceptable, but in other cases an approach involving reduced transient stress on the devices may be preferred.

One such low-stress approach to start-up is illustrated in FIG. 4A in which diodes 106, 118 are replaced by controlled switches such as for example thyristors 150 and 152. It will be appreciated that these thyristors may be operated in a phase-controlled approach as shown in FIG. 4B, for example as used in lighting-type dimming circuits, to reduce stress on start-up, although other switching devices may equally be employed albeit without the simplicity of the pulse turn-on and inherent turn-off characteristics of thyristors. An alternative mode of operation of the thyristors is as bypass devices for a resistor/diode combination which can achieve a slow rise time of the voltages in the converter.

By restricting or delaying the input voltage amplitude in such a fashion and commencing operating at low voltage, capacitor voltages may be permitted to stabilise. The transition to normal (or close to normal) voltage being present on the boost capacitor can thus involve a mixture of boost stage operation and of power fed via the inrush-limiting thyristors, with a gradual voltage rise allowing capacitor voltage balance conditions to be maintained.

An approach to ensure initialisation of the flying capacitor voltages of FIG. 4A is to include an initialisation arrangement. In the exemplary arrangement of FIG. 5, an active initialisation circuit is shown through provision of a resistor network. In this exemplary arrangement, a plurality of resistors (171, 172, 173, 174, 175) in series are switchably connected by a switch 160 between the first and second output nodes. Intermediate nodes of the series of resistors are switchably connected by a set of switches 161, 162, 163 and 164 to the flying capacitors 144, 146. Once the voltages on capacitors 144,146 are initialised, the initialisation circuit may be switched out.

The resistors (171-175) may be switched in using small FETs (160-164). These FETs may for example be switched with low-cost isolated drive techniques as described in PCT/EP2014/055215 filed 14 Mar. 2014 entitled "A GATE DRIVE CIRCUIT FOR A SEMICONDUCTOR SWITCH", the entire contents of which are herein incorporated by reference which may be advantageously combined with the transformer construction described below.

Figure 5:
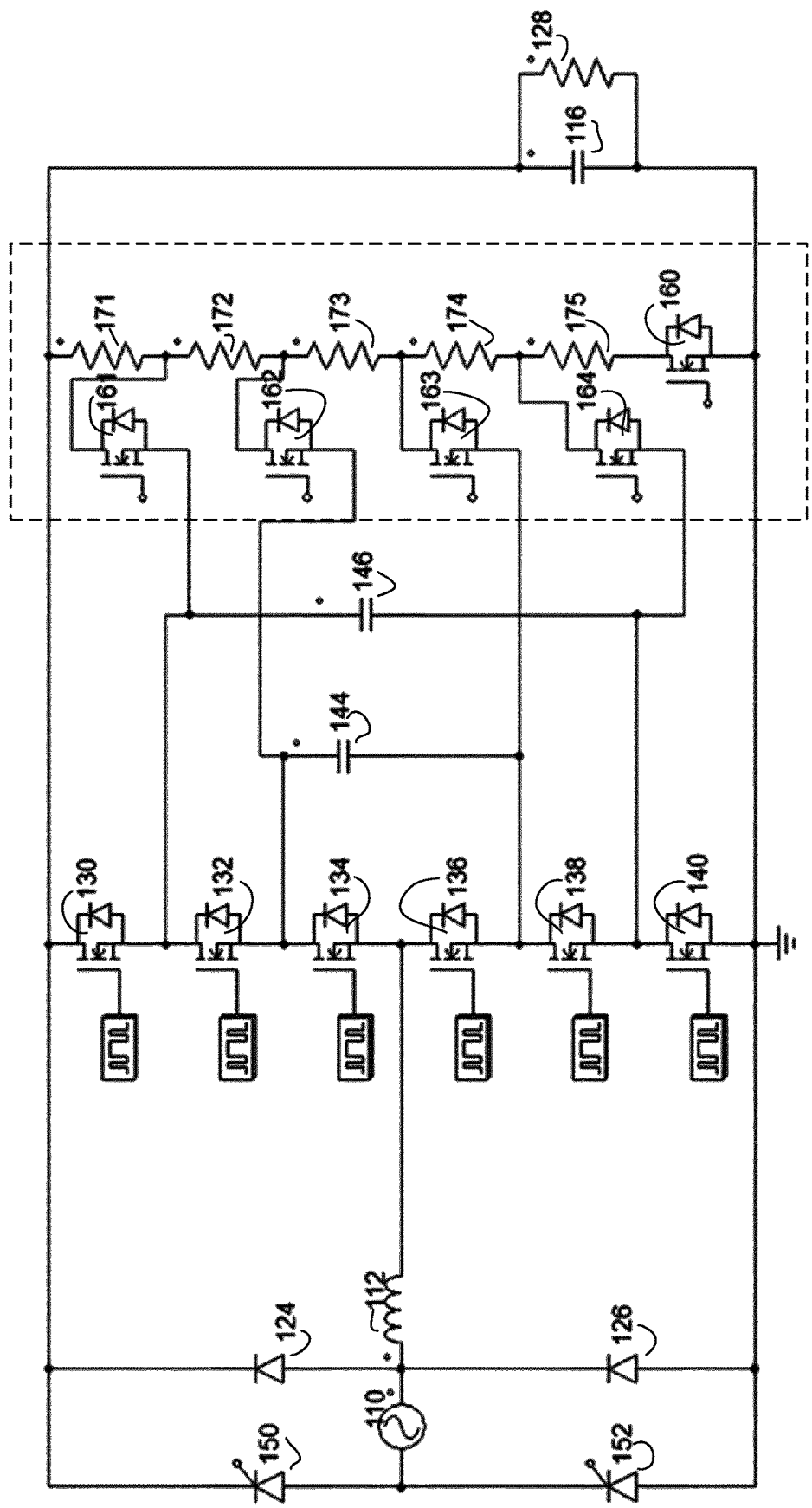
FIG. 5 illustrates another way that the arrangement of FIG. 3 may be modified by including an active initialisation circuit (shown in dashed outline) to provide for initialisation of voltages of the capacitors within the multi-level arrangement.
Figure 5A:
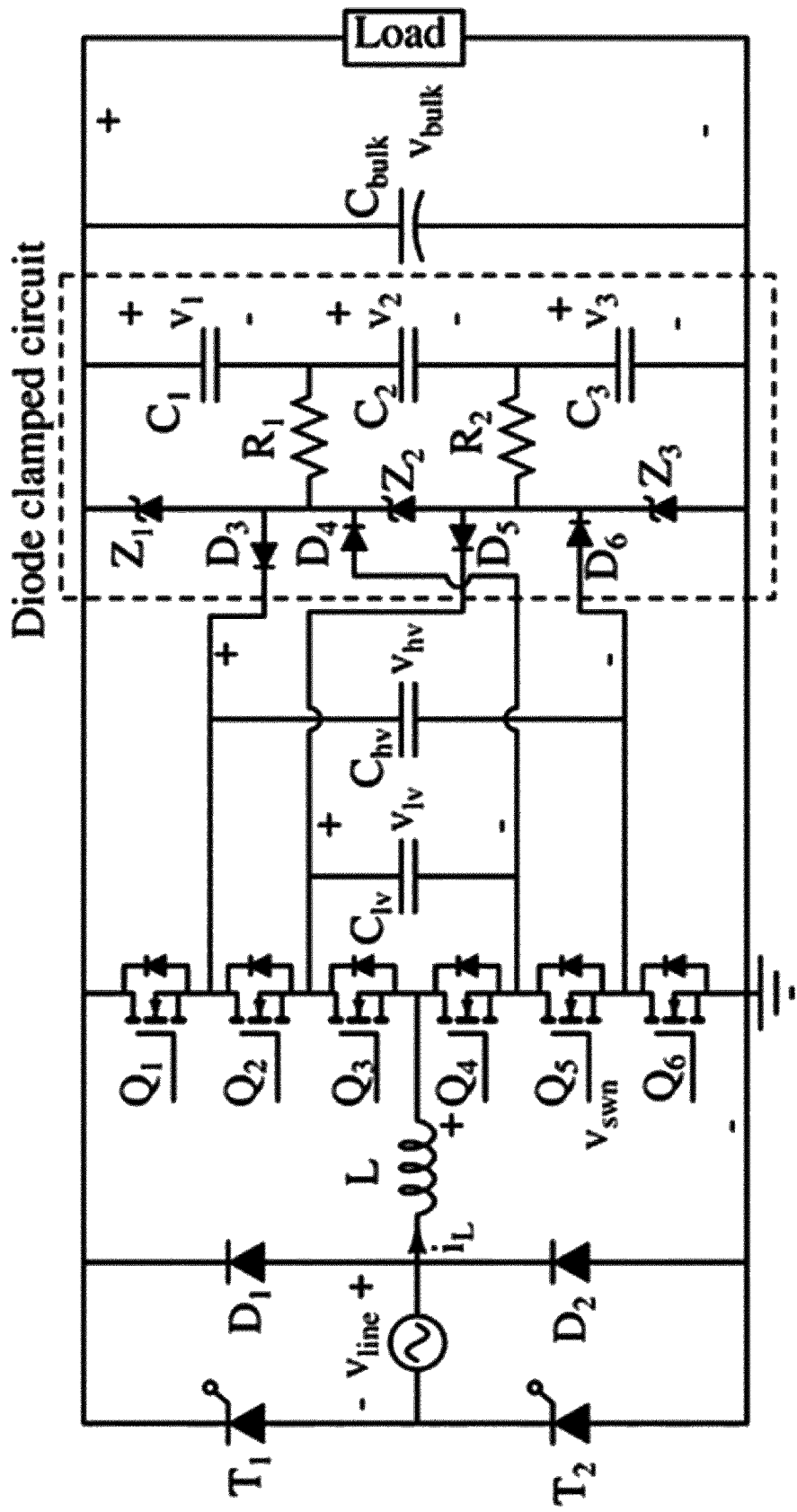
FIG. 5A illustrates an complementary approach to that of FIG. 5, in which an alternative passive clamping circuit is employed, the other aspects of the approach correspond to those of FIG. 5 albeit with different labels on the components.

An alternative approach with ongoing clamping of the flying capacitor voltages shown in FIG. 5 is through the use of a passive voltage clamped circuit, for example, a diode arrangement as shown in FIG. 5A. In this arrangement, which corresponds generally to that of FIG. 5 except the initialisation circuit provided by switched resistor arrangement comprising switches 160-164 and resistors 171-175 is replaced by a passive diode clamped circuit. As explained above, the topology of FIG. 5/5A is derived from a bridgeless totem pole arrangement but employs multiple flying-capacitors. As explained above, two thyristors $T_1$ and $T_2$ may be used in the position of rectifier diodes. The use of thyristors allows ease of inrush current management, start-up and light load control. In order to prevent inrush current from going through the inductor L and MOSFET string $Q_{1-6}$ on start-up, two bypass diodes $D_1$ and $D_2$ are provided to allow an alternative path to the bulk capacitor $C_{bulk}$. The inductor L, MOSFET string, and flying capacitors $C_{lv}$, and $C_{lh}$ form a 4-level synchronous boost converter. However, unlike existing multi-level topologies, the flying capacitor voltage can be initialized and forced to return to their balanced levels during transient responses by the passive clamped circuit.

For completeness, the nature of the operation of the converter of FIG. 5A will now be explained in greater detail (although it will be appreciated that this largely mirrors the operation of FIG. 5 described above).

Due to the symmetry of the proposed rectifier, only positive half-line cycles are considered here for simplicity of explanation, and the thyristor $T_2$ is assumed to be conducted while $T_1$, $D_1$ and $D_2$ are off. Without the balance enforcement mechanism provided by the passive clamping circuit, the circuit as shown in FIG. 5A may be considered as a four-level boost converter.

Figure 5B:
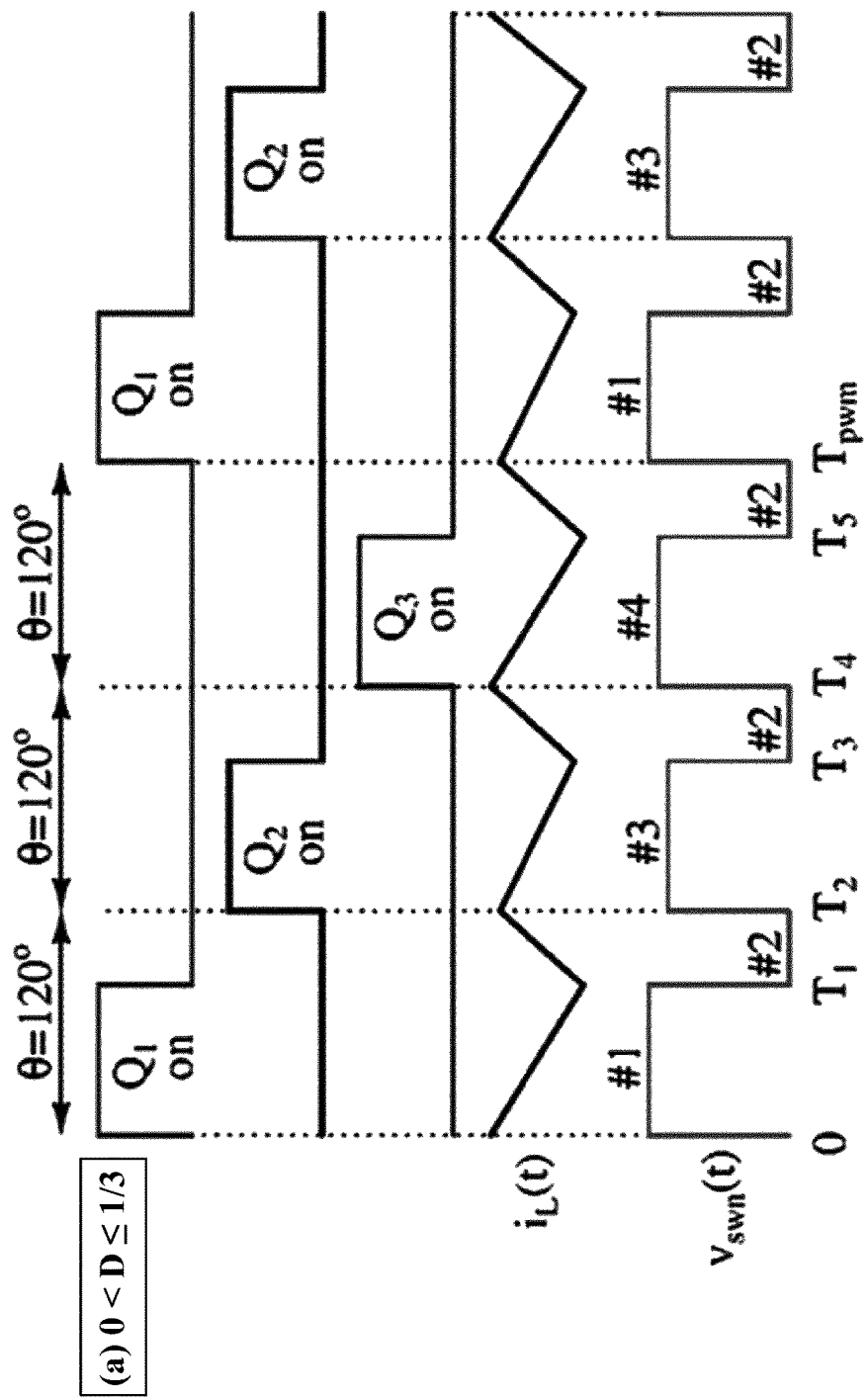
FIGS. 5B, 5C and 5D represents exemplary waveforms during operation of the arrangement of FIG. 5A, with FIG. 5B representing a situation where the duty cycle D is between 0 and ⅓, FIG. 5C representing a situation where the duty cycle is between ⅓ and ⅔ and FIG. 5D representing a situation where the duty cycle is between ⅔ and 1.
Figure 5C:
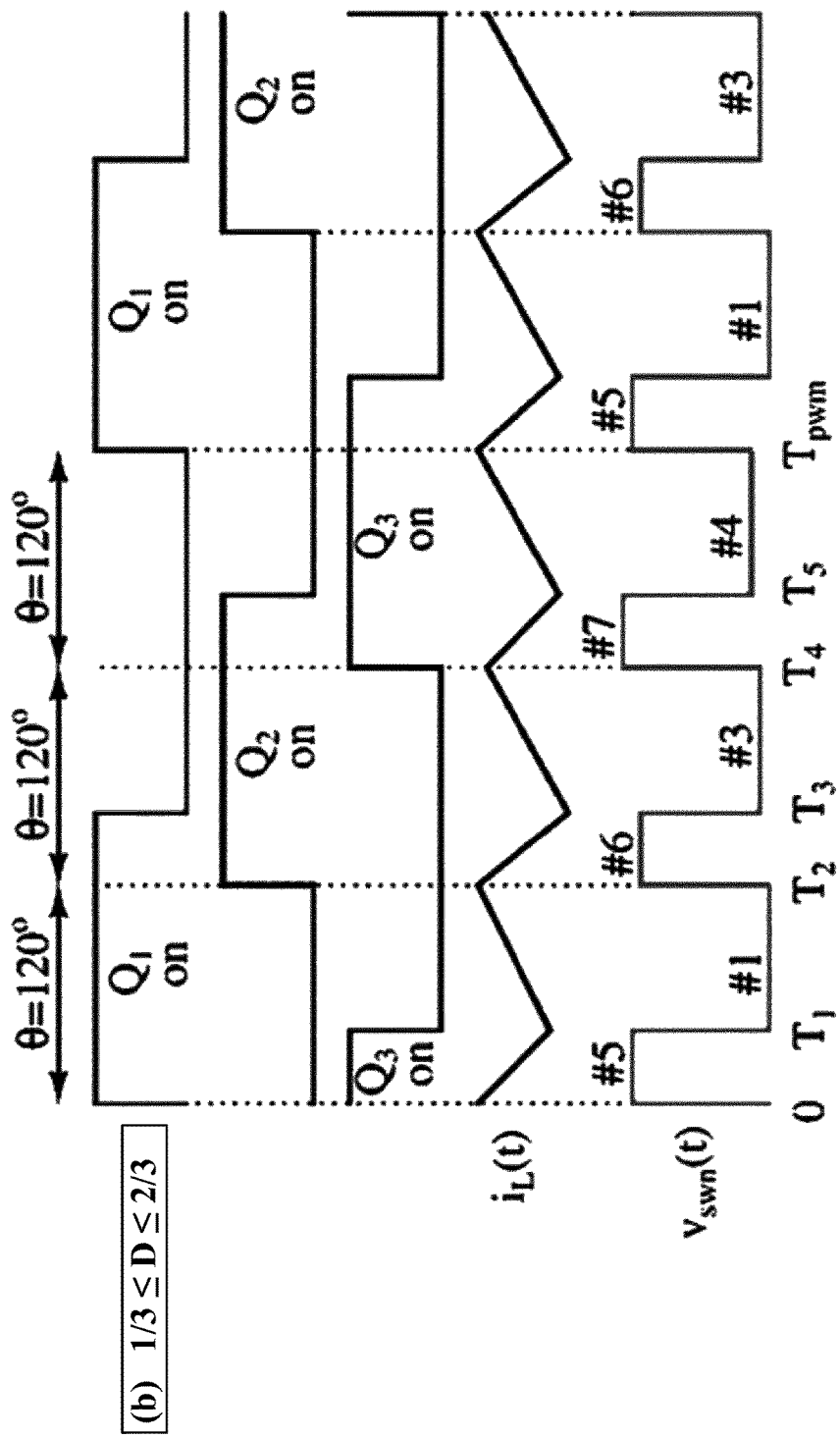
Figure 5D:
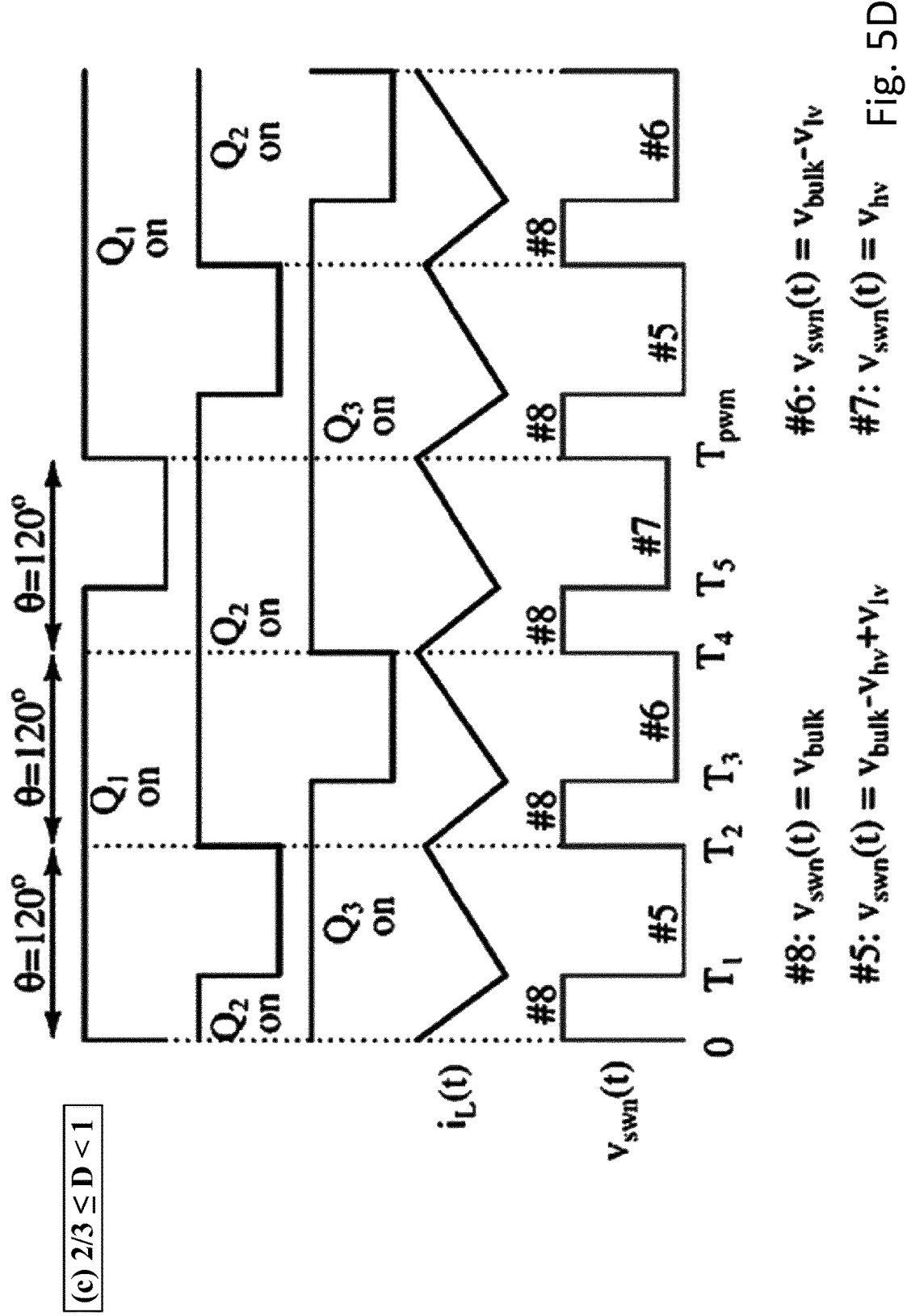

The operation of six MOSFETs in the boost converter can be summarized as follow. Firstly, the switching devices are split into 3 pairs of switches including (Q1, Q6), (Q2, Q5), and (Q3, Q4). Each arrangement of paired switches is operated in a substantially complementary manner, i.e. when one switch of the pair is on, the other must be off and vice versa. The control signals for the three top switches Q1, Q2 and Q3 share the same duty ratio D, but are different in phase by an angle of 120 degrees while Q6, Q5 and Q4 are driven by negating the driving pulses of Q1, Q2 and Q3, respectively. Since a phase shift of 120 degrees is equivalent to a time shift of one third of the switching period, the four-level boost converter changes its operation every time D crossing the ⅓ and ⅔ points as illustrated in FIG. 5B where $v_{swn}(t)$ and $i_L(t)$ represent the switched node voltage and inductor current, respectively.

Applying inductor voltage-second balance and capacitor charge balance principles allows derivations of the converter gain and flying capacitor voltages at steady state, and may be stated as set forth below in Equation (1).

$$V_{bulk} = \frac{V_{in}}{D}, \qquad (1)$$

$$V_{lv} = \frac{1}{3}V_{bulk},$$

$$V_{hv} = \frac{2}{3}V_{bulk}$$

Equation (1) suggests that the operating voltage of all switching devices (e.g. MOSFETs) may be approximated as being technically reduced by a factor of 3 as compared to that of a conventional totem pole arrangement. It will be appreciated that this allows the usage of 200V MOSFETs which switch much faster and more efficiently than 600V counterparts. The maximum peak-to-peak inductor current and flying capacitor voltage ripples may be calculate as $$\Delta I_L = \frac{1}{36} \frac{V_{bulk} T_{pwm}}{L}, \qquad (2)$$

$$\Delta V_{hv} = \frac{P_{out\_max} T_{pwm}}{V_{bulk} C_{hv}},$$

$$\Delta V_{hv} = \frac{P_{out\_max} T_{pwm}}{V_{bulk} C_{hv}}$$

It will be appreciated from an examination of equation (2) that the inductor current ripple in the proposed four-level boost converter is approximately one ninth of that of a conventional one. In other words, for the same ripple current, the exemplary four-level approach presented requires 9 times less inductance than the conventional boost converter, or equivalently 9 time less stored energy/volume for the same power rating.

The passive, diode based, clamped circuit is used to initialize the flying capacitor voltages force them to return to their balanced levels during transient responses. The diode clamped circuit as illustrated in FIG. 5A helps to address capacitor initialization and voltage balancing associated with implementation of four-level boost converters. In particular, for example, if $Z_1$, $Z_2$ and $Z_3$ are 160V zeners, turning Q1 and Q2 on while keeping other MOSFETs off will activate $Z_2$ and $Z_3$, which in turn charges $C_{lv}$ and $C_{hv}$ to $V_{bulk}$–320 and $V_{bulk}$–160, respectively. Therefore, the worst-case voltage stress on the switching devices is 160V which is safe for 200 W rating MOSFETs. Two pairs of diodes ($D_3$, $D_4$) and ($D_5$, $D_6$), current limit resistors $R_1$ and $R_2$, and a capacitor array ($C_1$, $C_2$, $C_3$) are provided to supply additional charge to $C_{lv}$ and $C_{hv}$ during the condition where $V_{lv}+V_{hv} \leq V_{bulk}$. Although the balance enforcement circuit has no effect when $V_{lv}+V_{hv} > V_{bulk}$, it actually help to damp/interrupt all disturbances occurring in the flying capacitor voltages due to continual variations in the duty ratio over the line cycle.

To demonstrate the effectiveness of the approach described above, some experimental results for an exemplary implementation of the circuit of FIG. 5A will now be presented in which a switching converter was constructed to operate at universal line voltage, i.e. 85-265 Vrms, with the bulk capacitor voltage being allowed between 175V-420V, a converter switching frequency selected of 180 kHz With a power output of 200 W, maximum pk-pk voltage ripples of 20V and maximum pk-pk current ripples taken as 400 mA, the design procedure suggested the following components: L=165 uH, C=68 uF-450V rating-electrolytic, $C_{lv}=C_{hv}$=400 nF-450V rating-ceramic, $C_1=C_2=C_3$=100 nF-250V rating-ceramic, and $R_1=R_2$=50Ω. The main switches (MOSFETS) selected from Infineon (Part No BSZ900N20NS3G) were N-Channel MOSFETs having a 200V rating and a notional on resistance of approximately 90 mΩ.

Exemplary circuits constructed have proven extremely positive with respect to operating characteristics and efficiency.

Indeed, the use of this approach using a four level PFC rectifiers with 200V MOSFETs allows for a reduction is size by a factor of approximately 9 of the PFC choke, an approximately 4 fold reduction in overall product volume and significant improvements in rectifier efficiency and power density. Whilst the design may be extended to more than 4 levels (e.g. to six levels), the overall result becomes less desirable in terms of cost and efficiency to the 4 level approach. However, it will be appreciated that this may change as alternative switching devices and capacitors become available.

It will be recognised that these approaches combine clamping for active devices, at levels outside of the normal operating range, with resistively derived balance correction. The design basis is that multilevel converters using the flying capacitor approach can operate with minimal clamping-related losses in normal operation. A small deviation from a balanced condition is corrected using a small current through the resistors whereas a gross deviation can activate the zener devices, but in normal operation the current flow and associated dissipation in the circuitry intended for this balance-enforcement and clamping circuitry is designed to be minimal.

If the resistor values are effectively zero, then one has a "hard clamping" condition with material current through diodes as significant currents are shared between capacitors. There is no opportunity for ripple voltage of any material value to develop on the flying capacitors without this being clamped into the capacitors forming part of the balance network, with associated current flow and dissipation. This "hard clamping" approach can of course be appropriate if it is desired to operate devices closer to their nameplate voltage rating, and/or if devices without avalanche rating are to be deployed. This approach is also consistent with being able to use the voltage across one or more of the capacitors in the network for derivation of local power, as the balance network now resembles a switched-capacitor divider network.

An approach for low-loss turn-on and fast or resonant turn-off has been the subject of the earlier application just referenced. An extension to this approach may be implemented here with the examples above in the context of controlling the switches of the multi-level switching arrangement and in other arrangements which are described below.

Figure 8:
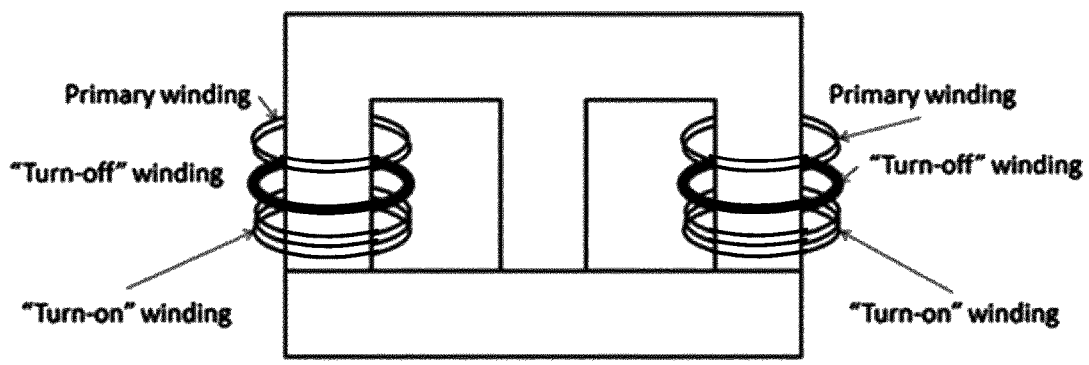
FIG. 8 illustrates a third aspect of the application and provides a transformer for use in providing turn-on and turn-off pulses in a switching circuit, for example as shown but not limited to that shown in FIG. 6, the transformer forms two separate transformers on a single core and thus for example transformers 210 and 212 from FIG. 6 may be co-formed.

The approach which is claimed generally in independent claims 19 and 20 may employ a transformer. This approach will now be explained with reference to the exemplary arrangement of FIG. 6, where a small multi-legged core, such as an E-core (for example an E6.3 core) as shown in FIG. 8 may be used to implement turn-on and turn-off drive for both complementary elements in a switch pair 226, 240 (such as switches 130 and 140 in FIG. 4A).

The principle of operation is that that under normal conditions complementary commutating drive is required, and as an example it may be necessary to supply a long drive pulse for perhaps 40 ns to get to the threshold level and a further 40 ns for full enhancement of the device. On the other hand, turn off may be effected quite rapidly and a short pulse of 10 ns on the transformer may well suffice. In the context of the present application, a long pulse may be generally taken to be at least twice the length of a short pulse.

The requirement here is for a moderately fast transition in normal operation, essentially to hinder the build-up of charge in the device turning off, which could be associated with losses due to the reverse recovery phenomena. The normal operating mode thus ensure that the driven FET is being turned on as the complementary FET is held off. Likewise, by applying short pulses it is possible to ensure that both devices as turned off, as may be required under fault conditions. Thus, in the exemplary transformer construction of FIG. 8, the transformers 210 and 212 may be implemented together on the same core, albeit on different legs. Thus, transformer 210 may be viewed as being comprised of the windings on the left hand leg of the transformer in FIG. 8 with transformer 212 provided on the right hand leg. Turning in greater detail to FIG. 8, to the individual transformers on each leg the primary winding is shown, with the secondary turn-off winding in close proximity (low leakage and additional eddy current loss associated with the initial transition, and the secondary turn-on winding located at a greater distance. The extra leakage inductance, the reduction in slope associated with ferrite and copper losses associated with the initial transition and the typically materially higher threshold of the power FET as compared with the threshold level of the control FET all combine to ensure that a short pulse serves to provide minimal increase in the $V_{gs}$ of the main power FET, with additional series R and shunt C elements used as required to ensure adequate margin at the expense of suppression of the ringing effect that would be associated with a reduction in drive power.

Figure 6:
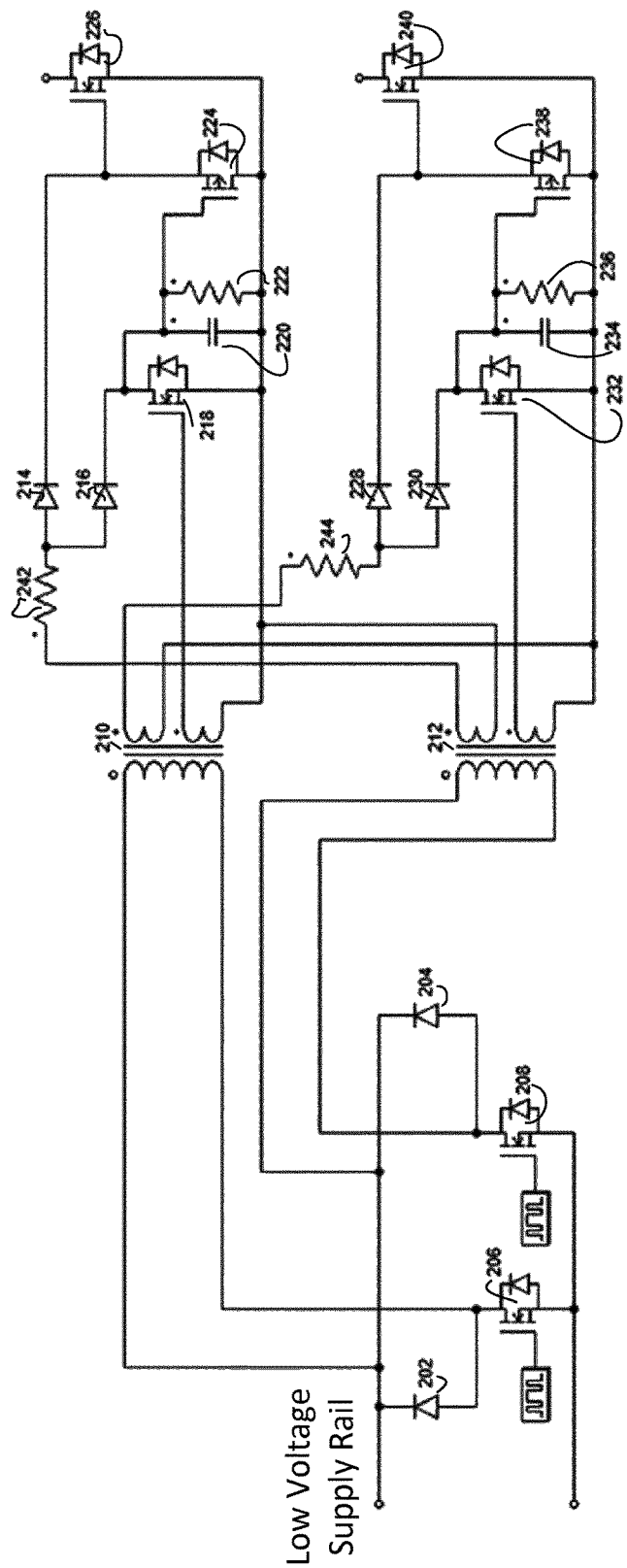
FIG. 6 illustrates a second aspect of the present application comprising a drive circuit for providing drive signals to two power transistor devices (226, 227) which may be employed in controlling the operation of complementary switches, as for example but not limited to complementary switches employed in the circuits of FIGS. 3, 4A, 5 and 5A.

Another way in which the arrangement of FIG. 6 may be employed is that short pulses may be generated concurrently by each of switches 206 and 204 which are passed through transformers 210, 212. Using this technique, both devices 226 and 240 are caused to be in an off state. This technique referred to pulse crashing means that whilst normally the switches 22 and 240 are operated in a complimentary fashion, that by operating the drive circuits concurrently the 'off' aspect of each drive circuit cancels the respective 'on' aspect. As a result, the switches 226, 240 may be operated in a complimentary fashion or concurrently switched off. This may for example be useful in the event of a detected overload or failure. Whilst, the arrangement of FIG. 6, is shown for the control of MOSFET type switches, the arrangement is not so limited and it may for example be employed with Gallium Nitride (GaN) FET type devices.

When using GaN type devices, care should be taken to limit the voltages applied to the primary drive winding of each of the transformers to limit the resulting voltage applied to the gate.

The circuit of FIG. 6 may be modified to provide further protection by providing a voltage clamp within the drive circuit to ensure that the gate source voltage is clamped. This protects against ringing or other parasitic voltage effects in the drive circuit that might bring the gate-source voltage above the rating for the GaN devices.

The voltage clamp may comprise a zener diode placed connected between the gate and source of each GaN switching device. i.e. GaN replacements for 226 and 240. However, a more preferable approach is to place the voltage clamp in the turn-off part of the drive circuit. This for example, may be done by employing a zener diode placed in parallel with the capacitor and resistor elements (220, 222, 234, 236) in the turn-off circuit.

An exemplary circuit implementation employing these transformers, for example as in FIG. 6, will now be explained. Such an arrangement may be employed to switch complementary switches such as for example the previously described complementary pairs of switches in FIGS. 3, 4 and 5.

Here, the requirement may be taken to be to switch devices 226 and 240 (which may for example be one the pairs 130-140, 132-138, 134-136) in a complementary fashion. This is suitably performed with a consistent short dead time.

It will be appreciated that the condition of both switches 226 and 240 being "on" is not to be allowed. At the same time, the condition of both switches 226 and 240 being "off" may need to be realised rapidly under fault or surge conditions. As noted, a short (typically less than 20 ns) pulse applied to the gate of 206 will result in this pulse being transmitted rapidly to the gate of device 218, with this turning on and pulling down (or keeping low) the voltage on 220 and 222, thus keeping the gate of 224 low. A low-threshold PMOS device or a PNP bipolar device may be used for 224, thus ensuring that the gate of the main power device 226 is held low. This pulse is also transmitted via resistor 244 to diodes 226 and 230. The transformer construction and resistance is designed such that turn-on of 240 is insensitive to a short pulse. If a longer pulse—typically >40 ns—is applied, then 240 will begin to turn on, with 226 being held off. The desirable property of the complementary device being held off when a device is being turned on thus obtains. It will be appreciated that a suitable controller may be configured to present the desired pulses for switches 206, 208.

It will be recognised also that the resting condition of main switches 226 and 240 is "off" and that a rapid transition to an "off" condition can be achieved by deploying one or more suitably-spaced short pulses via the drive circuitry.

Figure 7:
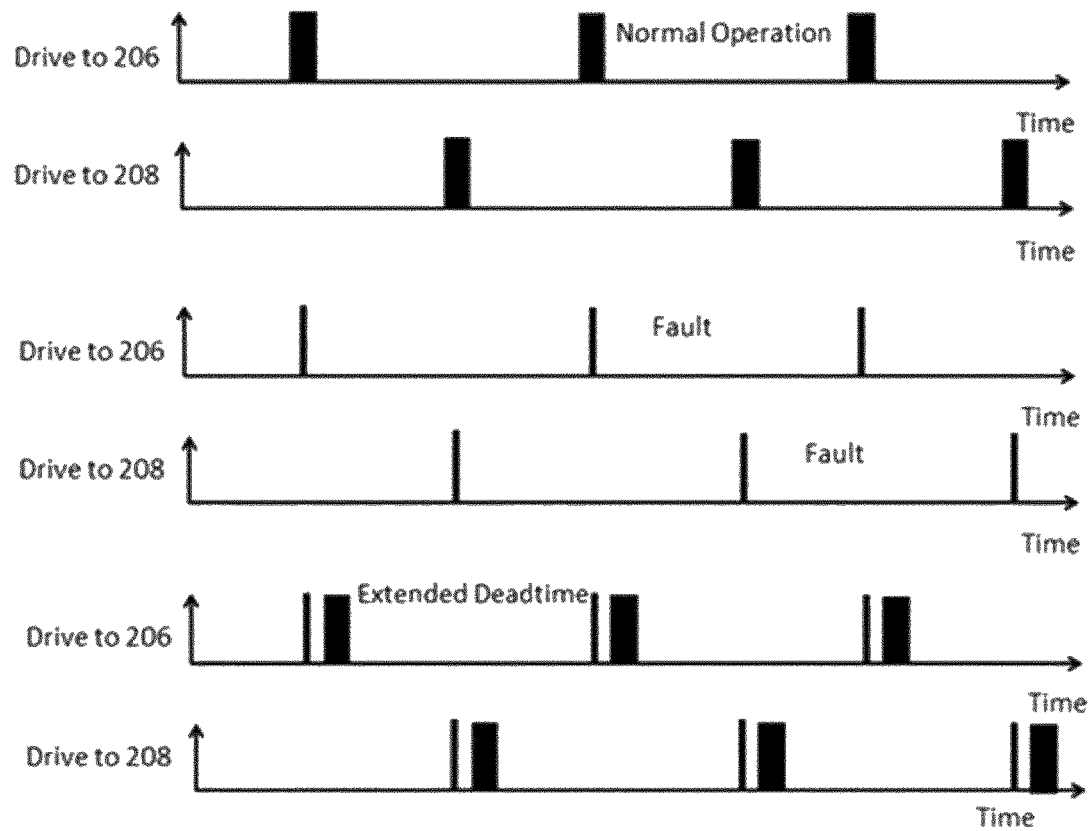
FIG. 7 illustrates an exemplary timing diagram for use with the arrangement of FIG. 6 and in which the top two timelines represent exemplary pulse signals that may be applied to each of drives 206, 208 from FIG. 6 to control switches 226 and 240 during normal operation, with the middle two timelines representing how shorter pulses may be applied to each of drives 206, 208 to ensure control switches 226 and 240 are switched off and remain switched off during a fault condition and a third situation in which a short pulse is used with a longer pulse where extended dead-time is desired.

Likewise if an arbitrary deadtime is required between for example 226 turning off and 240 turning on, then initially a short pulse can be applied to 206 followed by a longer pulse to turn on 240. This exemplary timing is illustrated in FIG. 7, not necessarily to scale as the wider pulses typically will have a width between 40 ns and 120 ns and the smaller pulses will typically be between 10 ns and 30 ns, with the switching period ranging from perhaps several microseconds to several tens of microseconds. Thus the ratio of the duration of a long pulse to a short pulse may be up to 12 to 1.

A transformer construction is as shown in FIG. 8, using two sections of an E-core with a shared centre post and with minimal air gaps. Here the phasing of the drive windings may be chosen such that any stray flux induced by the drive signals in the inactive winding results in a voltage that is clamped by the relevant reset diode 202 or 204. An aspect of using such small cores is that they (or at least one half of them and possibly both) may be formed within a circuit board using conventional PCB techniques as will be discussed.

A further aspect of the present application will now be described with reference to the isolation-stage converter of FIG. 9 which is intended in operation to follow a PFC stage for example of the type described above. The isolation-stage converter is a dual ratio LLC converter. It will be appreciated that this arrangement employs switches which are intended to be operated in a complementary fashion and so the previously described control circuits and transformer may be gainfully deployed with this aspect.

By employing a dual ratio converter, the size of the hold-up capacitor 252 may be reduced.

Alternatively stated, that for any given "bulk" electrolytic capacitor holdup performance is optimised—i.e. that the bulk capacitor can be discharged to the maximum feasible extent.

Generally, if a normal downstream converter is designed for nominal operation at 400V but with an ability to operate down to 300V, then nine sixteenths of the energy stored in the bulk capacitor is unavailable. In contrast, if the downstream converter can operate down to 100V, then only one-sixteenth of the stored energy is unavailable. In this latter case, assuming that holdup performance is the sole constraint on the electrolytic capacitor, the holdup time can be extended by a factor or two or the required capacitance value for a specified holdup time can be reduced by approximately 50%.

Figure 9:
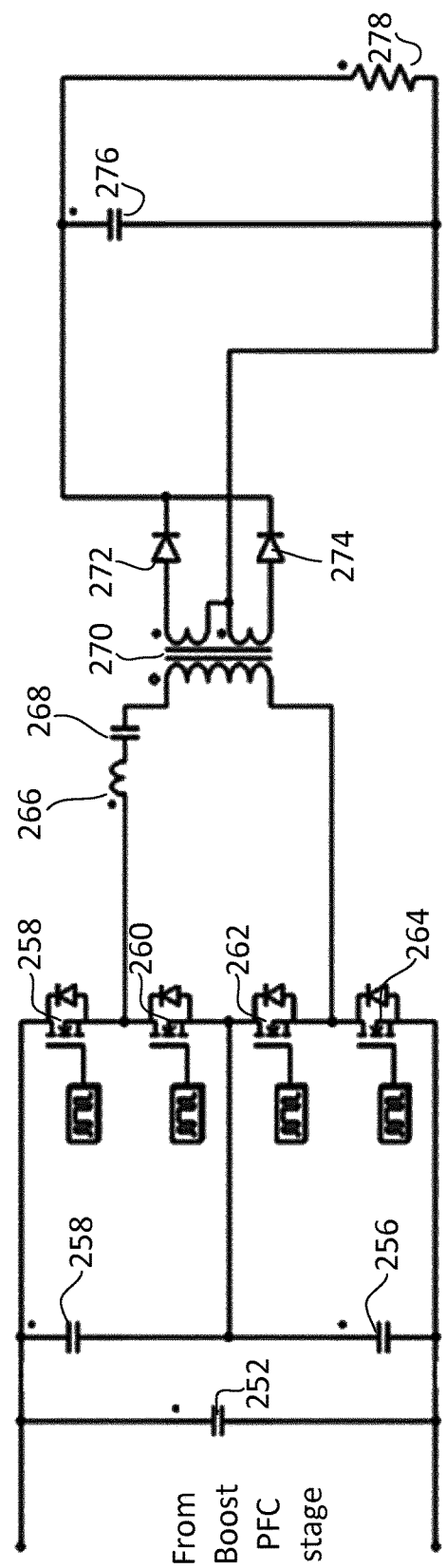
FIG. 9 is a further aspect and provides a 3-level LLC-type converter implemented to optimise holdup performance which is suitable for connecting to the output of a PFC stage, for example those shown in 3, 4A, 5 and 5A, it may also use the drive circuitry of FIG. 6 to operate its complementary switching devices.

This is achieved with the implementation shown in FIG. 9.

Figure 10A:
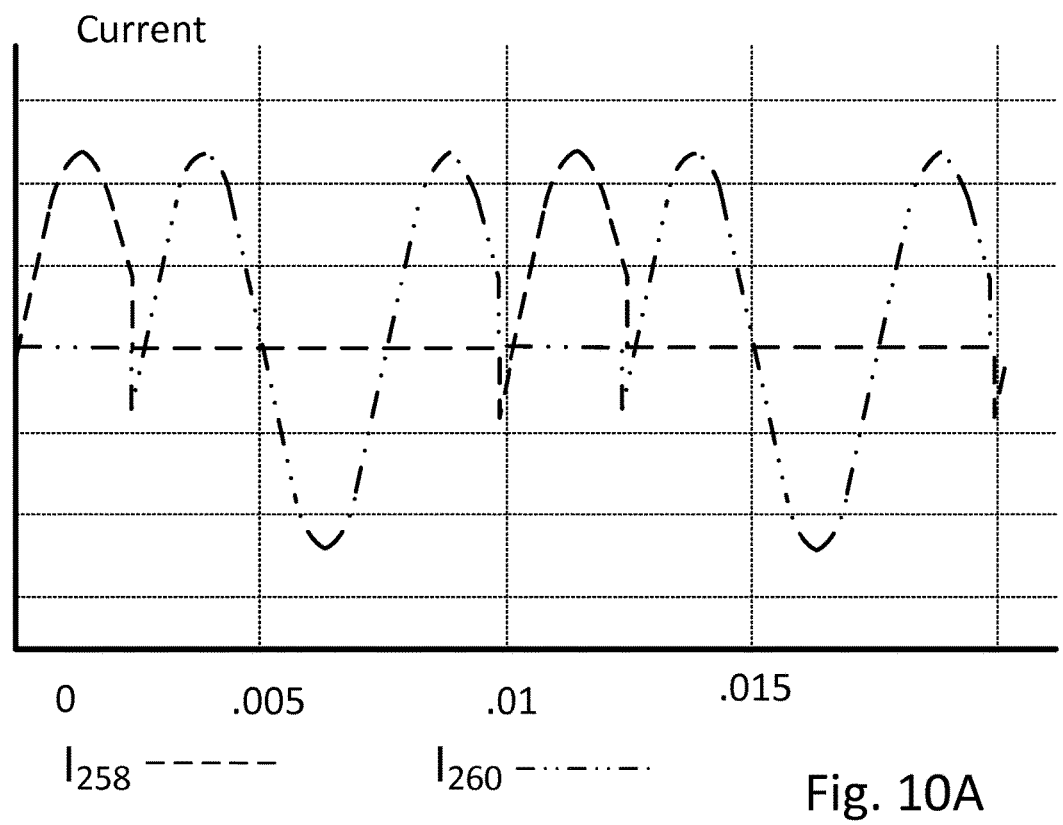
FIGS. 10A and 10B illustrates current waveforms associated with the normal (10A) and gain-boosted (10B) operation of FIG. 9.

Referring to FIG. 9 in this case, the modulation pattern for reduced gain has four principal phases, with current flow as shown in FIG. 10A, for the case where 266, 268 and the primary of 270 form an LLC resonant "tank". As device pairs 258/260 and 262/264 are each fed by a capacitor, complementary switching of devices within each of these pairs is desired.

In phase #1, the uppermost switch 258 is on, with 260 off and 262 on. This means that Vin/2 is applied across the series combination of inductor 266, capacitor 268 and the primary of transformer 270, and from DC balance considerations the steady-stage component of voltage across capacitor 268 will be Vin/4. In the second operating phase 258 goes "off" with 260 coming "on" and the voltage input to the series combination is clamped to zero as 260 and 262 are "on". In the third phase, 260 remains "on", with 262 now going "off" and 264 coming "on", again applying Vin/2 to the series combination, The fourth and final phase is similar to the second phase, with 260 and 262 clamping the series combination. The result here is to produce a double-frequency half-amplitude square wave drive to the series combination, as compared with a conventional half-bridge drive approach.

Figure 10B:
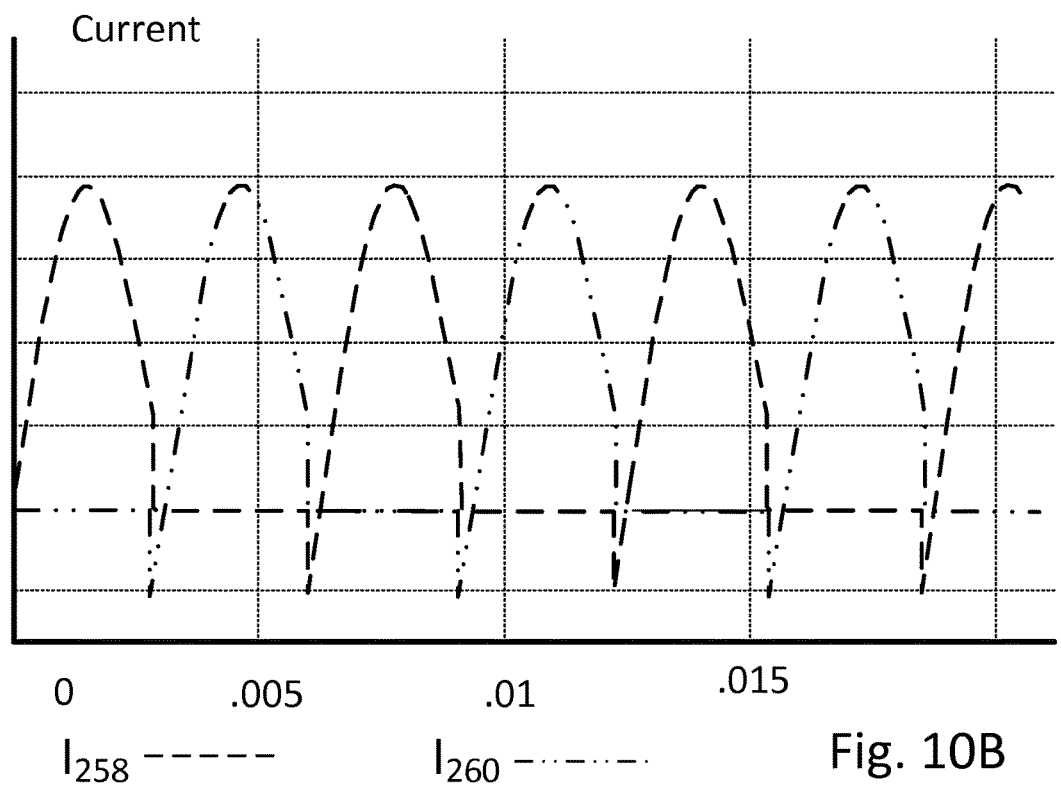

The conventional half-bridge drive approach can be replicated by operating in two phases, with current flow as shown in FIG. 10B, namely in the former phase 268 and 264 are "on" with the complementary devices 260 and 262 "off". This applies the full Vin to the series combination of inductor 266, capacitor 268 and the primary of transformer 270, with the DC component of voltage on 268 settling at Vin/2. In the latter phase, 258 and 264 are "off" with 260 and 262 clamping the series combination such that there is zero net voltage across it. The net peak-peak applied voltage is thus Vin, as in a conventional half-bridge, and the frequency of drive can be adjusted to be approximately double that applied in the earlier mode of operation if resonant operation is to ensue.

Figure 11A:
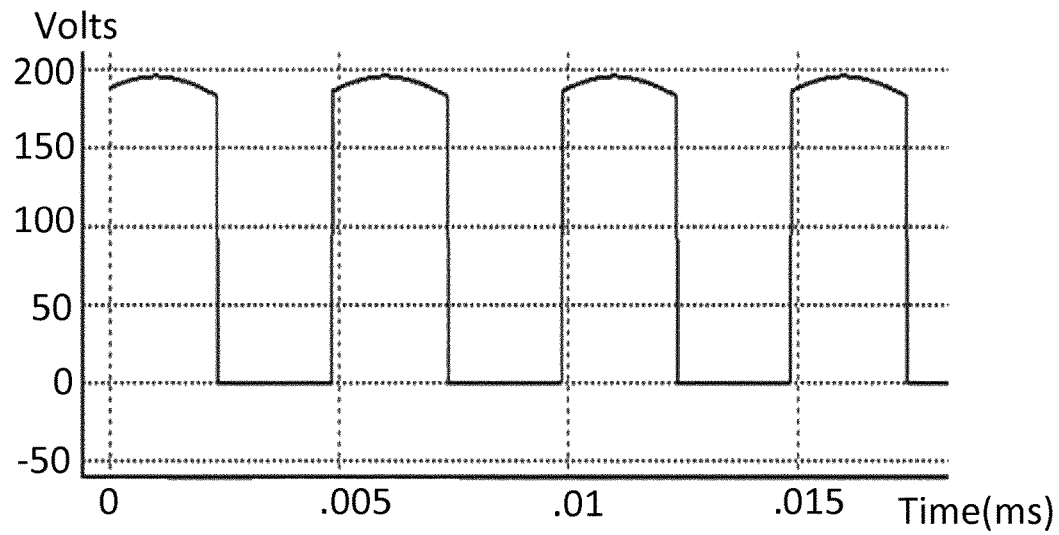
FIGS. 11A and 11B illustrate exemplary voltage waveforms deriving from different modulation schemes as applied to the aspect of FIG. 9, with 10 representing double-frequency operation with 370V applied and 11 representing a "higher gain" mode with 185V applied.
Figure 11B:
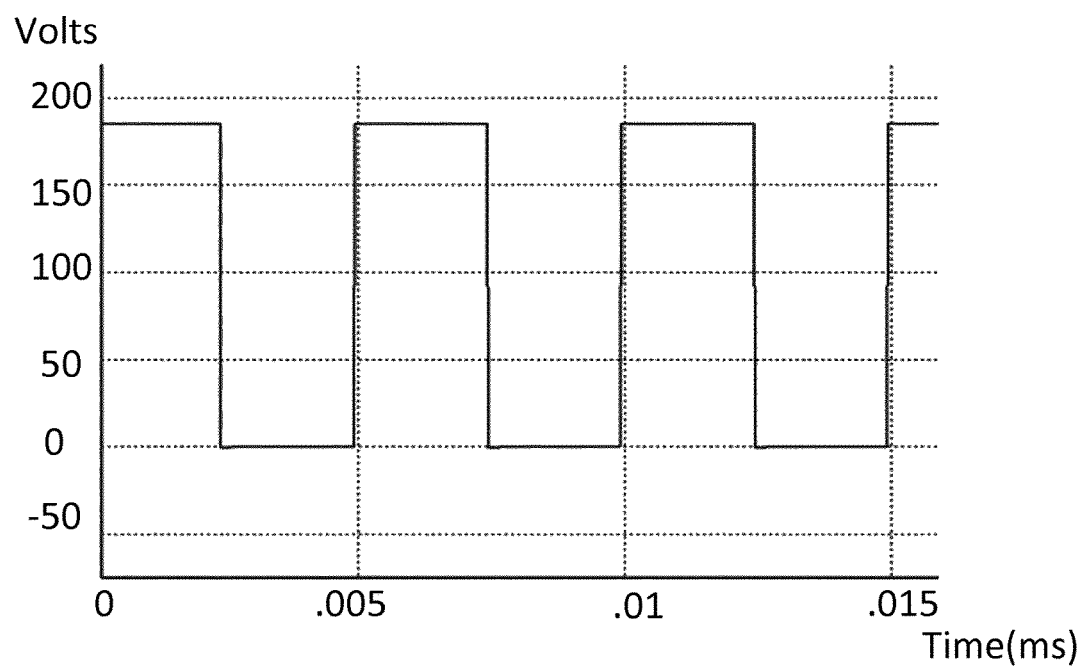

The ability to generate substantially-similar drive waveforms at two different values of input voltage is shown in FIGS. 11A and 11B where FIG. 11A represents the double frequency drive from operating switches at 100 KHz with 370V applied and FIG. 11B represents the single frequency operation at 200 KHz from 185V.

This circuit also defaults with a modulation pattern adjustment involving synchronous rather than phase-shifted switch operation to give a primary side voltage gain of 0.5. Operation with balanced fixed duty cycle and using frequency variation to control gain, as is the normal operating pattern for LLC operation, is postulated in examples of prior art.

In design for holdup maximisation, typically one wants a highly efficient operating mode (given the relevant example of a bulk capacitor for operation in the "universal" line range) from approximately 320V to 430V, to allow for operation under conditions of line-frequency ripple and transient-induced deviations in the voltage on the bulk capacitor from a setpoint usually approximating to 400V. Below 320V input, it is necessary to provide for stable and safe power delivery, but efficiency and device thermal stress is a less relevant consideration as the converter will typically spend less than 20 ms operating in such conditions.

Designing a converter with a single operating gain mode or "range" to provide wide holdup represents a challenge. In a buck-type approach optimal operating conditions are typically found at maximum duty cycle, corresponding to the minimal input voltage, thus condemning operation under normal operating conditions to narrow duty cycles as typically associated with poorer efficiency. In an LLC-type approach, designing for a high boost ratio to allow effective holdup operation at lower voltages results in larger circulating currents associated with low values of transformer magnetising inductance, again compromising efficiency.

With converters possessing an additional gain "mode", such as the converter of the type described (or indeed using a converter type as outlined in an earlier application (GB1404655.1, filed 14 Mar. 2014) by the present inventor, the entire contents of which are herein incorporated by reference), then the converter design in the normal operating mode is not compromised, and the higher-gain mode can be activated below the voltage level corresponding to maximum gain in normal mode.

The present application thus provides a method of control of the switching converter of FIG. 9. This method of control is illustrated with respect to FIG. 16, which demonstrates the changes that arise as a result of line dropout on the supply voltage. The method of control may be implemented within a suitable controller such as micro-controller or similar device.

The controller operates to ensure the converter is operating in a first resonant mode having a first resonant frequency and mode gain. The controller maintains the converter in this first resonant mode whilst the bulk capacitor level is above a first predefined level (corresponding to the minimum voltage required for the converter to operate in the first resonant mode). As the bulk capacitor voltage falls below the predefined level, the controller switches to a second mode of control. This second mode of control is not a resonant mode. The second mode is suitably a form of PWM, which may be obtained by inserting dead-time into the switching cycle. It will be appreciated that the arrangements of FIGS. 6 to 8 facilitate such control of complementary switches.

The converter has a second resonant (high gain) mode and the controller switches the converter into this second resonant mode when the bulk capacitor falls below a second predefined level. It will be appreciated that the first and second predefined levels may be determined from a measurement of the voltage on the capacitor or by reference to the ability of the converter to maintain an output, i.e. the mode switching is effected as the output performance decreases.

Whilst, using two separate resonant modes may be effective to improve holdup, the advantage of using the intermediate control mode is that the gain of the converter is limited.

The design task here is illustrated with an example. If a converter is designed for near-optimal operating conditions at 400V with a practical lower limit of 320V for the main operating mode, then entering the low-voltage mode at 320V would result in a gain level corresponding to optimal operation at near 200V-input. This can be addressed by clamped or unclamped PWM operation or by operating very high frequencies so as to limit the gain.

Figure 12:
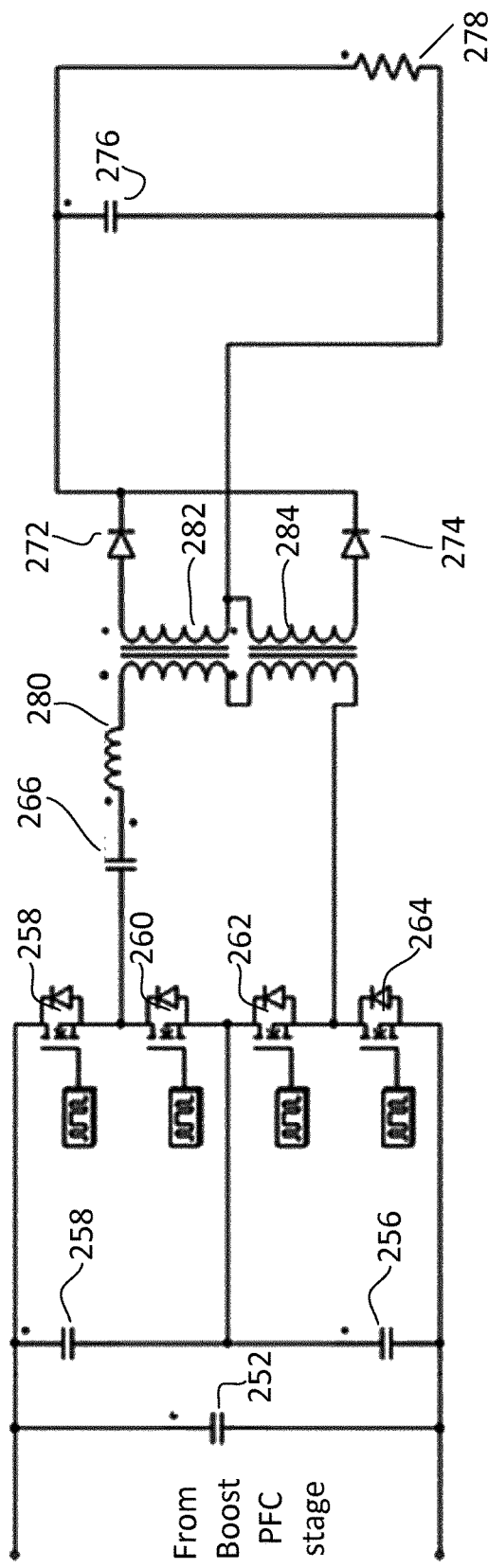
FIG. 12 illustrates a variation on FIG. 9 employing a resonant-transition approach provided by a further aspect of the present application in the context of optimising holdup performance.

The modulation scheme as discussed can be relevant to LLC-type resonant converters of the type show in FIG. 9, but also in particular to resonant-transition converters of the type shown generally in FIG. 12. Resonant-transition converters, of which the asymmetric half-bridge and the phase-shifted full bridge are the most common examples, use series inductance—which may be comprised totally of transformer leakage inductance—to ensure that on turnoff, the current flowing in such inductance drives the voltage across the complementary switch close to zero such that low-switching loss occurs. Particular attraction of resonant transition converters relates to reduced sensitivity to parameter values, reduced risk of (dangerous) capacitive mode operation under transients, the reduced switch RMS currents and the ability to vary duty cycle and frequency without the constraints imposed by operation with a resonant tank. The principal trade-offs are associated with greater voltage stress and possibly current stress associated with the output rectifiers, and with controlled rather than zero-current turnoff in the output rectifiers.

An example of a resonant-transition converter using a three-level structure is in FIG. 12. A comparable modulation pattern may be employed, but here one has the advantage of controllability of duty cycle. The converter as shown has a twin transformer or "current doubler" implementation, but could also comprise a more conventional approach with a discrete output inductor. The twin transformer effectively operates in "forward-flyback" mode where for example on one half-cycle 282 operates in forward mode with energy coming simultaneously from the inductance of 282 in flyback-discharge mode, and simultaneously energy is being stored in 284. In the subsequent half-cycle 284 discharges as well as operating in forward mode whilst 282 charges. 280 is the commutating inductance—which may consist totally of the leakage inductance of 282 and 284—and 286 is a DC-blocking capacitor, intended to have substantially constant voltage across it under normal operating conditions.

Figure 12A:
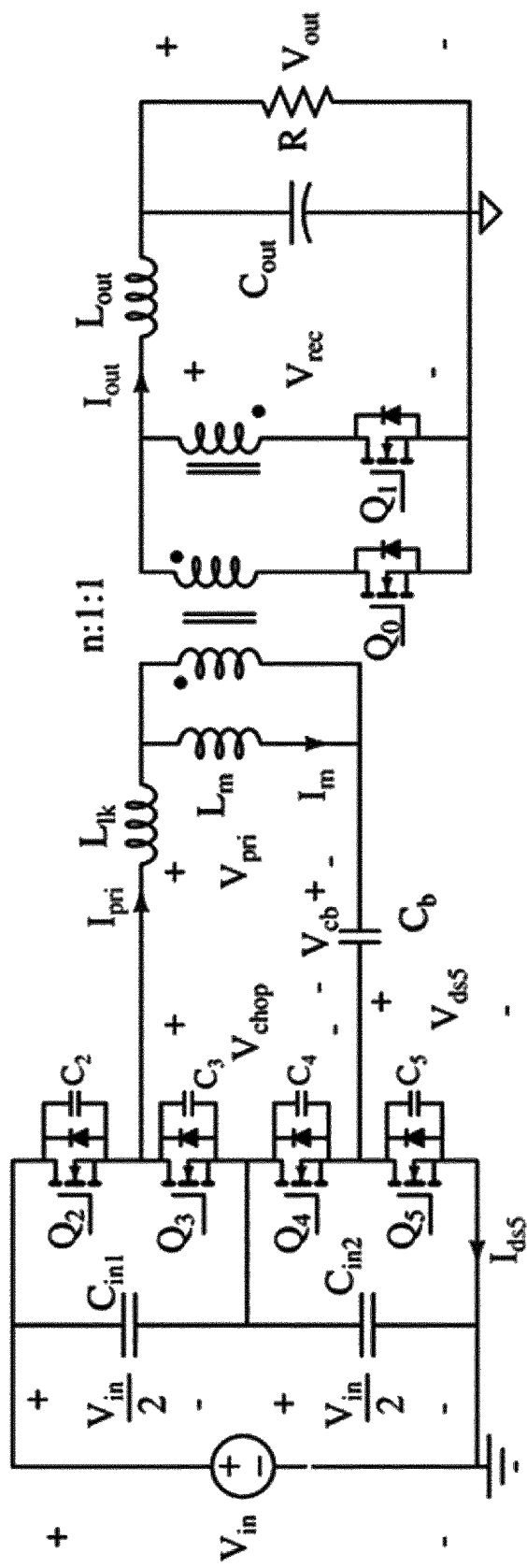
FIG. 12A represents an alternative practical implementation of the circuit of FIG. 12 demonstrating how leakage inductances and capacitances may be employed as illustrated to advantage, thus for example $Q_{2-4}$ are shown as transistors with their body diode and a capacitor in parallel for the leakage capacitance of the transistor, similarly the primary of the transformer is shown to further comprise a series leakage inductance $L_{lk}$ and a parallel leakage inductance $L_{lm}$.
Figure 12B:
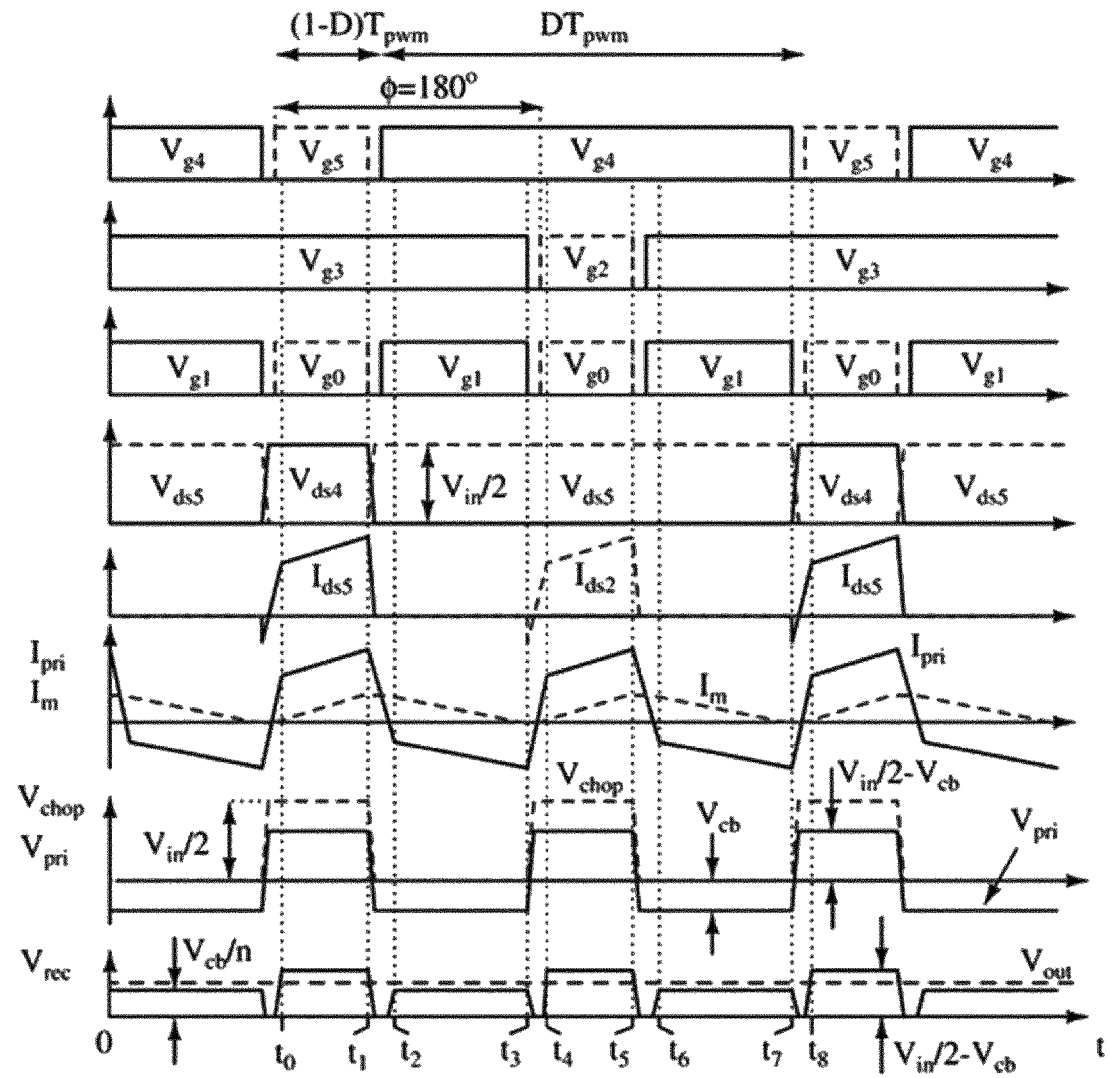
FIG. 12B represents exemplary voltages and currents during operation of the circuit of FIG. 12A.

A variation on the converter of FIG. 12 is represented in FIG. 12A having a two-level switching stage on the input to the resonant part of the circuit. Additionally, an output inductor $L_{out}$ is included. The two input capacitors $C_{in1}$ and $C_{in2}$ generate a bypass mid-point voltage of $V_{in}/2$ which defines the voltage stresses on the main switching devices when going through their cycle of operation. The capacitor $C_b$ acts as an energy storage and DC blocking device while the center-tapped transformer provides isolation and voltage transformation. The leakage inductance $L_{lk}$ of the transformer and parasitic capacitance $C_2$, $C_3$, $C_4$ and $C_5$ of switching devices form a resonant tank whereby the energy stored in $L_{lk}$ can be reused to bring the drain-source voltages of MOSFETs to zero before they are on, i.e. achieving Zero Voltage Switching. The pulse signals appearing at the secondary terminals are rectified by the synchronous rectifier (SR) $Q_0$ and $Q_1$, and subsequently filtered out by the output inductor $L_{out}$ and output capacitor $G_{out}$.

An important aspect in both FIG. 12 and FIG. 12A is to try an maintain the mid-point voltage balanced. As this ensures that voltage stresses are shared evenly between primary switches; therefore, the modulation pattern should facilitate such a target. In particular, the top MOSFET $Q_2$ is paired with $Q_3$ while $Q_4$ is paired with the bottom MOSFET $Q_5$. Each of paired switches is driven in a complementary manner, i.e. when one switch of the pair is on, the other must be off. The PWM control signals for $Q_2$ and $Q_5$ share the same duty ratio (1-D) and switching frequency $T_{pwm}$, but are different in phase by an angle of 180 degrees. For SR, $Q_0$ is set on when either $Q_2$ or $Q_5$ is on while negating the driving pulse for $Q_0$ gives that of $Q_1$. FIG. 2 illustrates the driving sequence for all switches in the proposed AHB converter, and resulting voltages and currents along the power transfer path. Thanks to the switching pattern, the output-to-input voltage ratio is simply controlled by the variable D which is defined as the duty ratio of $Q_4$.

The proposed converter has four main operating phases interleaved with four switch-transition phases during each switching cycle, which is highlighted by the timeline from $t_0$ to $t_8$ in FIG. 12C. Since the switching pattern is repeated within a cycle, only the first three sequential states are described in detail below.

Main phase 1 ($t_0$~$t_1$): power transfers from the capacitor $C_{in2}$ to the output through $Q_3$, $Q_5$ and $Q_0$, and charge $C_b$. Voltage across the primary side of the transformer is $V_{in}/2 - V_{cb}$.

Transition phase 2 ($t_1$-$t_2$): since $Q_5$ is turned off at t1, the primary current $I_{pri}$ will start charging $C_5$ and discharging $C_4$ until $V_{C4} = V_{Cb}$. After this time instant, the secondary side of the transformer is decoupled from the primary side. The output inductor current freewheels through both SR $Q_0$ and $Q_1$ while the capacitor $C_4$ continues to be discharged by the energy stored in $L_{lk}$. The body diode of $Q_4$ starts conducting when $C_4$ approaches zero, which allows ZVS if turning $Q_4$ on is triggered when such a condition is still maintained. Although $Q_4$ and $Q_3$ now are on, there is still no energy transferring to the secondary side until $I_{pri} - I_m = -I_{out}/n$ which happens at $t=t_2$.

Main phase 3 ($t_2$-$t_3$): the blocking capacitor now connects to the primary side of the transform in a reverse polarity fashion, which allows power stored in $C_b$ transferring to the output.

In the case of FIG. 12A, applying the inductor voltage-second balance and capacitor charge balance principles allows derivations of the converter gain, blocking capacitor voltage, operational voltage of MOSFETs, peak magnetizing current and output current ripple at steady state as summarized in Eq. (3)

$$\frac{V_{out}}{V_{in}} = \frac{2(1-D)(2D-1)}{n}, \quad (3)$$

$$V_{Cb} = (1-D)V_{in},$$

$$V_{FETs} = \frac{V_{in}}{2},$$

$$I_{mp} = (4D-3)\frac{I_{out}}{n} + \frac{(D-0.5)(1-D)V_{in}}{2L_m},$$

$$\Delta I_{Lout} = \frac{(1-D)T_{pwm}}{L_{out}}\left(\frac{(D-0.5)V_{in}}{n} - V_{out} - V_F\right).$$

where D denotes the duty ratio of $Q_4$, and may typically be limited between 0.75-1 while n is the turn ratio of the center-tapped transformer. Equation (3) shows that the operating voltage of the primary MOSFETs is only half of the input voltage, suggesting that it is possible to employ 250V MOSFETs for implementation because the nominal output voltage of an PFC stage is typically set around 400V. Equation (3) also suggests that, with the same rectified voltage, the output inductor current ripple is only half of that of the conventional one, which means a reduction in the magnetic volume of the order of 50% is achieved.

A circuit was constructed corresponding to FIG. 12A which was designed to achieve the following specifications: input voltage $V_{in}$=360V-420V, output voltage $V_{out}$=12V, switching frequency $f_{pwn}$=200 kHz, output power $P_{out}$=200 W, output current $I_{out}$=16.7 A pk-pk inductor current ripples $\Delta I_{Lout}$=2.1 A.

A design procedure suggested the following components: $L_{out}$=3.8 uH, $C_{out}$=1500 uF-16V rating-electrolytic, $C_{in1}$=$C_{in2}$=220 nF-250V rating-ceramic. The main switches selected were MOSFETS from Infineon (BSC16DN25) with 250V rating and on resistance of 165 mΩ. In the exemplary implementation, the center-tapped transformer was selected to have a turns ratio of 12:2:2 with the magnetizing inductance of 65 uH to account for leakage inductance.

Indeed, experiments showed that the novel stacked multiphase AHB topology inherits not only zero voltage switching from traditional AHB converters but also low voltage stresses and ripples cancelation from multilevel power conversion, allowing material reduction in magnetic sizes, EMI filters, and product volumes, and especially facilitating deployment of 250V-type MOSFETs as main switches. Although implementing the converter requires more switching devices as compared with traditional solutions, the efficiency and final costs of the design are not compromised. Therefore, the new topology is well suited to economical and compact realization of isolated DC-DC converters to be operated with a maximum input voltage of 450V and output power ranging from 70 W to 2 kW with a typical application after the PFC stage in two-stage universal line input AC-DC power supplies.

Figure 13:
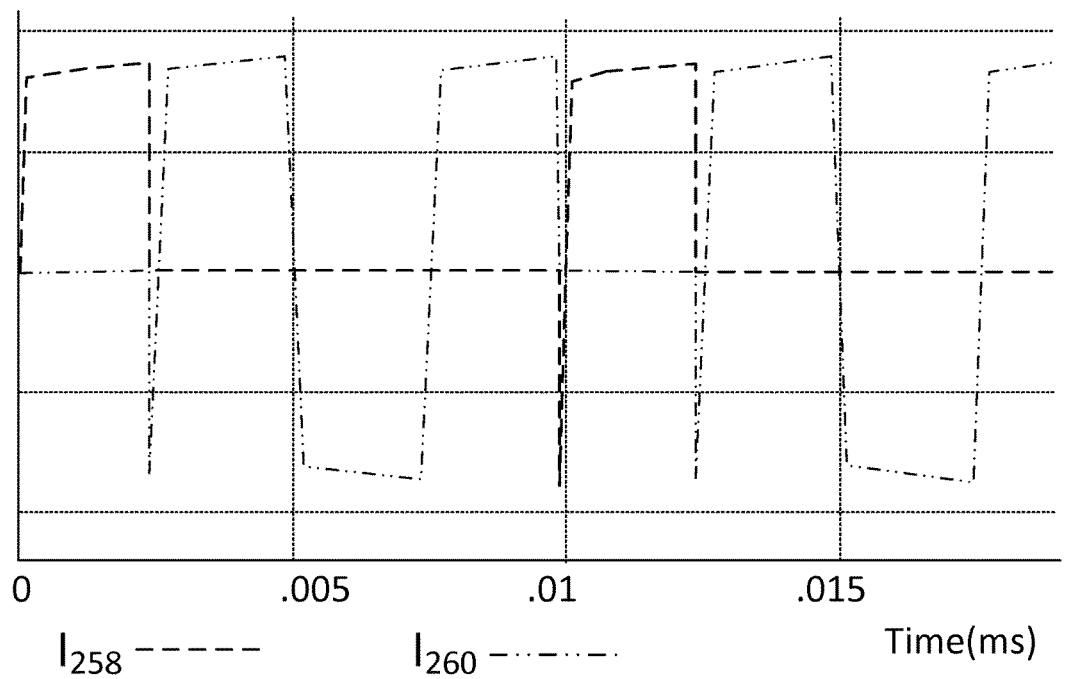
FIG. 13 illustrates exemplary current waveforms associated with the operation of devices 258 and 260 FIG. 12.

Similarly, FIG. 13 shows the current waveforms that obtain for FIG. 12 if a similar modulation pattern as described earlier is applied.

An alternative design task in the case for the arrangement of FIG. 12 in this instance relates to getting optimal operation over perhaps 320V to 430V, and this is effected initially by choosing the turns ratio for 282 and 284. For this range of operation, a turns ratio for a nominal 12V output may for example be 3.25:1, and the maximum gain would then obtain close to 320V. The gain needs then to be reduced for increasing input but this can be done in a manner that comes closer to balancing conduction losses in primary side devices if the duty cycle in the upper devices is increased. This will induce the necessary asymmetry to reduce gain but will also achieve a greater measure of current balance in the primary switches due to reduced operating time of the "middle" devices.

Figure 14:
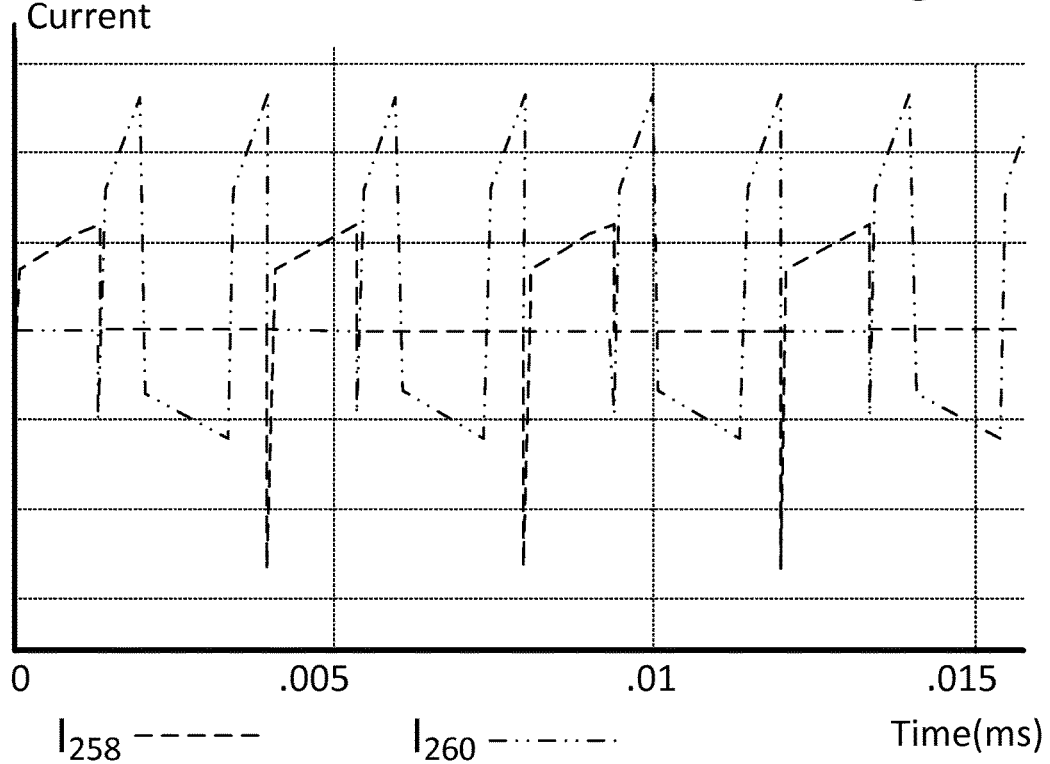
FIG. 14 shows exemplary current waveforms for the same devices as FIG. 13 associated with reducing effective duty cycle by increasing duty cycle of uppermost and lowermost switches.

An example of the operating conditions corresponding to 400V input given this turns ratio and 12V output is as shown in FIG. 14.

As a further development that can optimise performance by obtaining more equal voltage rating conditions for the output rectifiers, it is possible to operate with different turns ratios in transformers 282 and 284, and this additional measure of flexibility can also improve performance across this optimal operating range near 400V.

In the case of operation when the input voltage falls below a level where the normal mode achieves its maximum transformation ratio—typically selected to be in the range of 280V to 340V—then one can revert to the "full gain" mode. In this case, the gain will be "excessive" in the context of the desired output voltage without going to very low duty cycle if one is to operate in the normal clamped drive fashion with complementary operation of the switches. A very low duty cycle at high gain will impose severe stress on the output rectifiers.

Figure 15A:
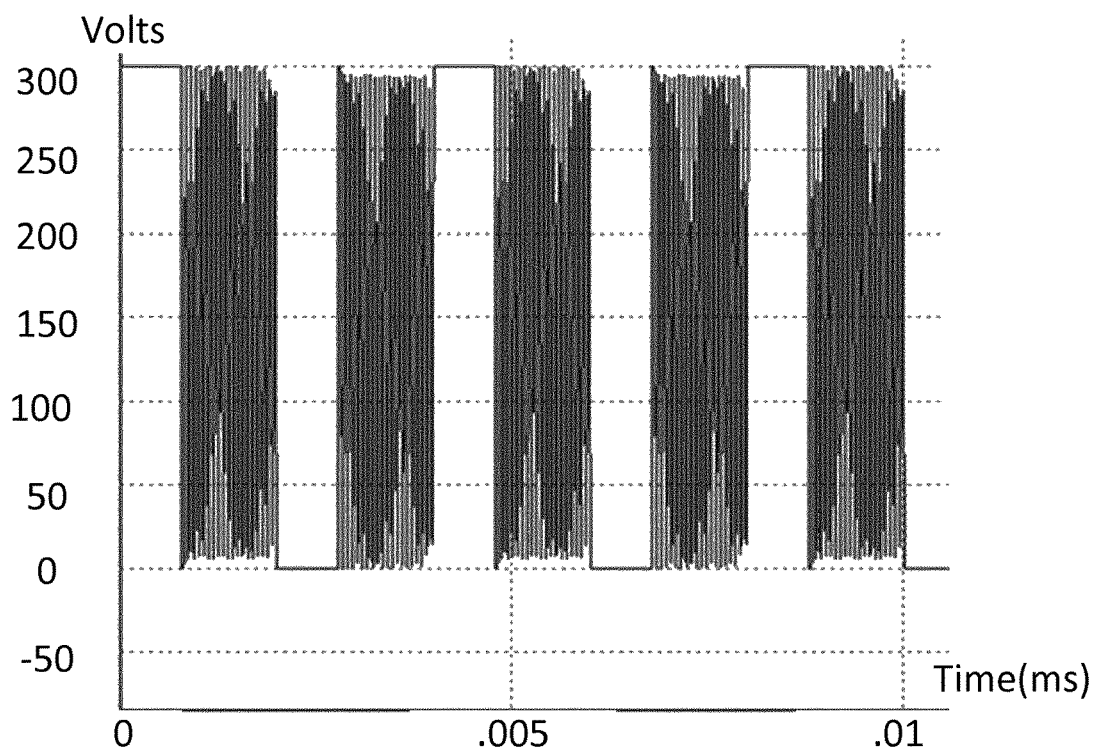
FIG. 15A shows unclamped half-bridge operation associated with entry into a higher-gain operating mode.

A preferred solution in this instance is to operate in the higher gain mode but with extended deadtime, i.e. with 258 and 254 on simultaneously, then all primary side switches off, then 260 and 262 on simultaneously and then all off, with the duty cycle width controlled to give the desired output voltage, as shown in FIG. 15A. During the deadtime the winding is unclamped except at extremities and will thus give a ringing waveform as indicated. The voltage applied to the series combination of 286, 280 and the primary windings of transformer 282 and 284. Zero-voltage switching is naturally lost in this mode, but an important characteristic is that the secondary rectifier voltage stress can be expected to be limited (excluding ringing and capacitor ripple voltage effects) to the input voltage divided by the aggregate turns ratio in 282 and 284. Specifically, if 320V is the "transition level" to the higher gain mode, and if 282 and 284 are respectively 3:1 and 3.5:1, then the rectifier stress in this mode can be held to 320V/6.5 or 49V plus switching effects as discussed. As the input voltage drops further, then normal clamped operation can resume at an input voltage level that is safe in the context of rectifier voltages, before dropping out at a level that will approximate 50% of the voltage level corresponding to the transition from normal voltage being necessary—i.e. if this figure was 320V, then the output of the converter can be expected to stay in regulation until 160V. For a converter operating at 400V, a "dropout" at 320V will correspond to 36% of the bulk capacitor energy being available whereas a dropout at 160V means that 84% of such energy is available.

Figure 16:
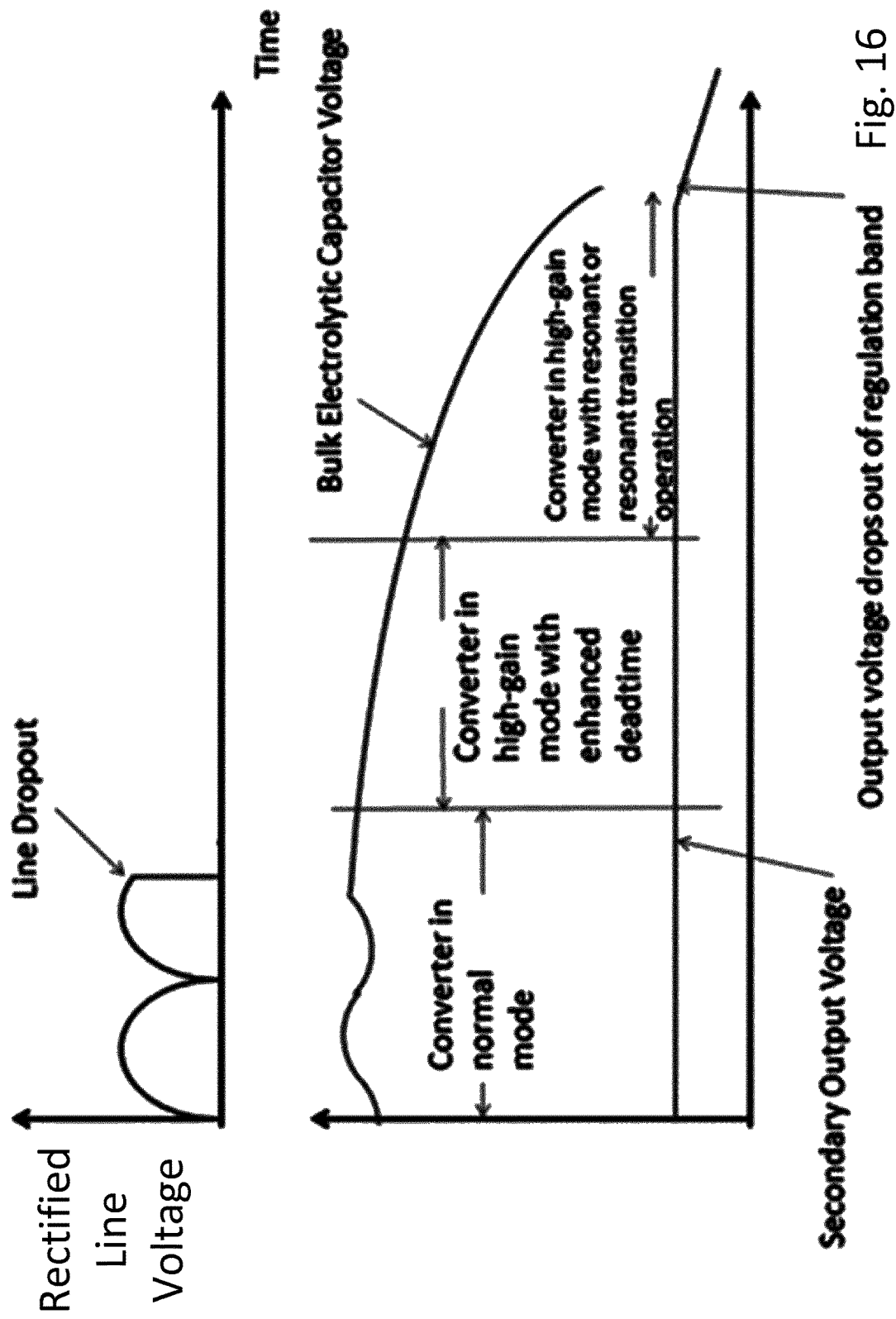
FIG. 16 illustrates operating modes of the converter following loss of AC line voltage, including a normal mode, the higher gain mode represented by the waveforms of FIG. 15A, and a resonant mode reflective of the waveforms of FIG. 15B.

Holdup operation is as with respect to FIG. 9 and is summarised in FIG. 16. FIG. 15A shows operation of the converter in a hard-switched fashion, which is generally acceptable. However, in certain situations, for example in conditions when lower operating loss may be required (for example in an extended brownout condition) then a more efficient approach may employ soft switching.

Figure 15B:
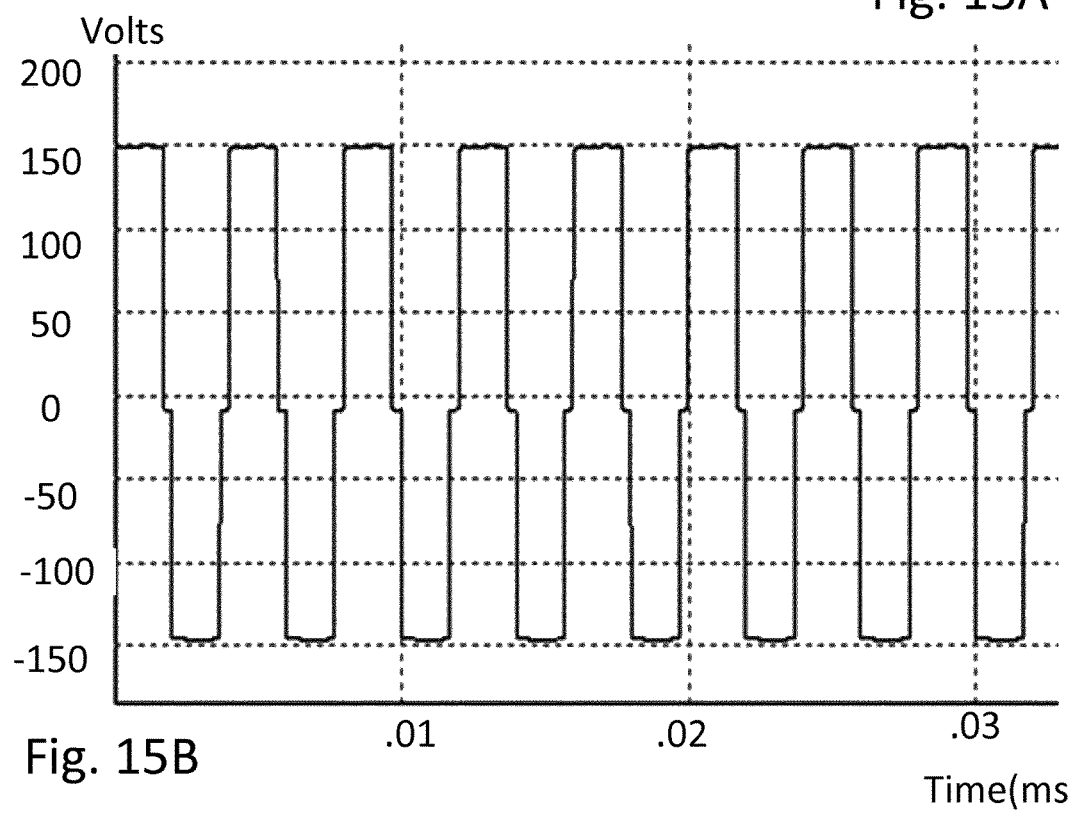
FIG. 15B shows an approach with zero-voltage switching capability associated with lower input voltage, in this exemplary situation 300V.

Thus as an alternative in addressing the issue of maintaining output voltage during conditions of holdup, the switch modulation pattern may be selected to allow the transformer primary to also operate with clamped voltage during the dead times as are associated with the operation depicted in FIG. 15B.

This is effected by alternately having switches Q2 and Q4 on simultaneously or by having Q3 and Q5 on simultaneously. It will be recognised that Q2/Q3 are operated in a complementary fashion, and likewise Q4 and Q5.

The operation is thus:
Q2, Q5 on simultaneously—active phase
Q2, Q4 on simultaneously—"dead time"
Q3, Q4 on simultaneously—active phase
Q3, Q5 on simultaneously—"deadtime"

Whilst the present application has been described above generally with respect to implementing PFC in an initial stage, an alternative approach is to transfer the power factor correction functionality (i.e. the current shaping) to the secondary side, and implement this at low voltage. This approach is aligned with the advances in capacitors optimised for low-voltages, such as supercapacitors, with this aspect promoting the attraction of secondary-side energy storage for providing the necessary energy supply to the output during zero-crossings of the AC line and for holdup purposes as discussed.

This may be advantageous as the availability of low-voltage silicon with very low conduction and switching losses can allow for high-frequency secondary-side boost converter operation under these conditions.

Location of the energy storage element on the secondary side also has advantages in that inrush current management is eased and the number of active devices in series with the AC line in a bridge approach is inherently greater than in a single ended boost stage.

A requirement naturally is that the preceding converter, involving transformation across the isolation barrier, be very efficient and also small size is very desirable. An electronic transformer of the type envisaged, with a quasi-fixed ratio between input voltage and output voltage, is normally termed a bus converter. Such a converter is optimised for efficiency at this nominally-fixed voltage transformation ratio. Ideally some form of "preconditioning" in the prior stage is desired such that the secondary-side boost converter implementing the power factor correction does not have to work over the full reflected voltage range. As an example here, if 200 W is being processed, the peak power is 400 W. If the universal line range is effectively divided by 20, so that this now corresponds after transformation to a range of peak values going from 18.65V (corresponding to 373V, the peak of the 264V "high-line" condition) to 6.35V (corresponding to 127V, the peak of the 90V low-line condition), then the current to be managed at 6.35V is approximately 63 A as compared to approximately 21 A under the high-line condition. If a primary side switching arrangement can operate as a "2:1 range selector", then the low-line peak can occur at a voltage of 12.7V with a requirement for approximately 32 A.

Figure 17:
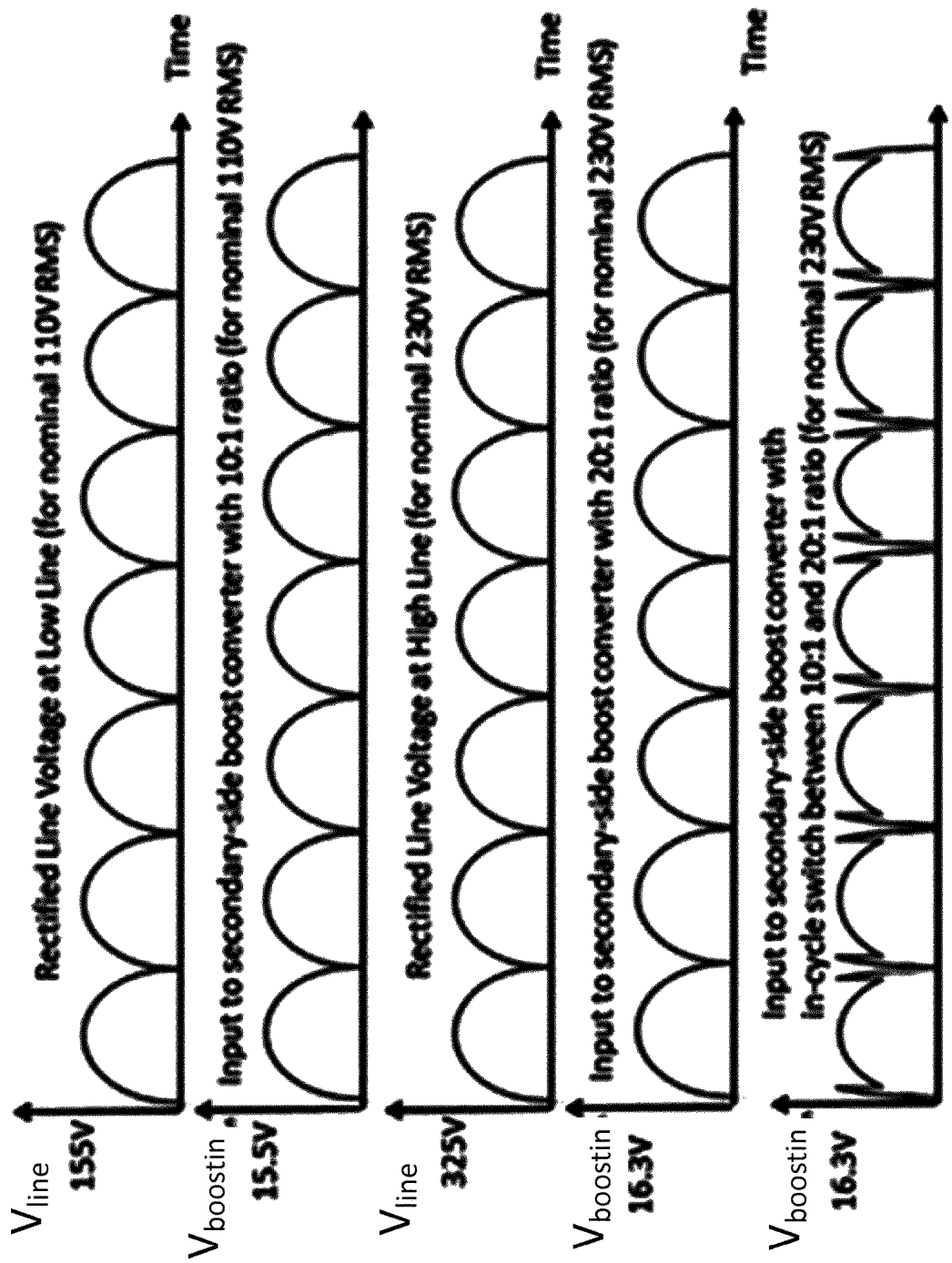
FIG. 17 shows effect of usage of dual-ratio transformation in deriving an input to a secondary-side current shaping converter from the input line voltage, with the second trace from the top illustrating using a 10:1 ratio where the line voltage is as shown in the first trace, with the fourth trace illustrating a 20:1 ratio in response to the higher rectified line voltage of the third trace and finally the bottom trace illustrating in-cycle switching between the ratios may be employed, with the higher ratio used in lower voltage ranges of the cycle.

This transformation ratio aspect can be seen from FIG. 17.

To operate such a secondary-side converter optimally, and also to ensure high-primary side and overall power train efficiency, a "dual ratio bus converter" is a suitable choice. Maximal efficiency can typically be obtained over a small transformation range for many topologies, and by adjusting the modulation scheme such that there is a plurality of such "transformation ratio sweet spots" a converter suitable for this functionality can be implemented.

An example of such a converter, with a dual-mode resonant LLC tank/transformer, was outlined in an earlier application (GB1404655.1, filed 14 Mar. 2014) by the present inventor, the entire contents of which are herein incorporated by reference. Multilevel LLC and resonant-transition approaches may also be used to implement the desired functionality, with efficient modes of operation at a plurality of transformation levels with a single resonant structure depending on the modulation scheme. Usage of such approaches also implies greater robustness under conditions of "capacitive" operation involving harsh reverse-recovery operation of high-voltage devices.

Resonant transition bus converters can also have a number of discrete ratios corresponding to optimal efficiency, with such approaches more capable of asymmetric PWM for fine resolution of transformer ratios. Indeed at lower power such converters will permit a level of current shaping control so as to allow direct feed into a secondary-side bulk capacitor.

Single-ratio bus converters typically use an LLC-type approach operating near the series-resonant frequency, or may use resonant transition converters operating at a maximum transformation ratio, i.e. nominally 50:50 drive ratio in the case of half bridge converters. The three level approaches with dual mode operation can be as in FIG. 18A for the LLC variant and in FIG. 18B for the resonant transition variant. In both cases 278 represents the load for the bus converter, which in this case is the input to a secondary-side current-shaping circuit.

Approaches to ensure operation of the LLC converter near resonance (such as disclosed by the inventor using primary sensing of body diode conduction) may be used.

In both these cases, the converters are fed from the AC line via a rectifier bridge, or bidirectional switches may be deployed for 258, 260, 262 and 264 if "bridgeless" operation is preferred. A modulation scheme as discussed earlier may permit operation at two gain settings, one effectively double the gain of the other, thus reducing the stress on downstream converters.

Figure 18A:
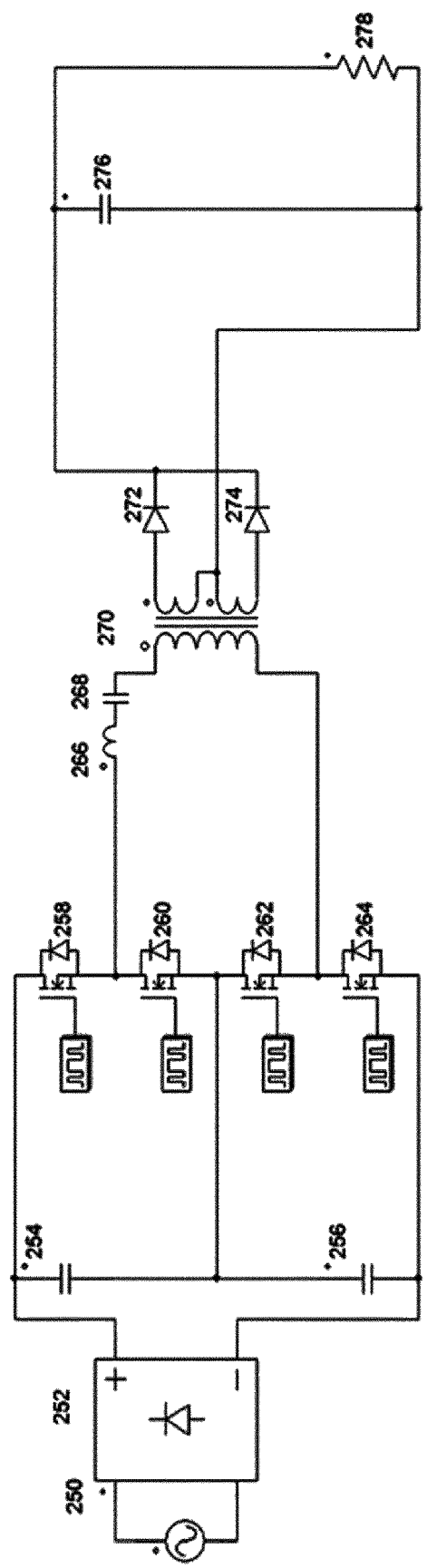
FIGS. 18A and 18B show exemplary implementations of a dual-ratio bus converter which may employ the technique demonstrated by FIG. 17, with 18A corresponding to an LLC implementation and 18B corresponding to a resonant transition implementation.

FIG. 18A shows a multi ratio bus converter. The multi ratio bus converter is a LLC converter type that may be used with a modulation scheme (similar to that used in the holdup augmentation context) that allows for double frequency operation and attenuation of the signal to the rectifiers by 50%, using typically 180 degree phase shift between drives to 258 and 264 and 25% duty cycle of 258 and 264, with 260 operating with complementary drive relative to 258 and 262 operating with complementary drive to 264. A move to a mode with 258 and 264 operating in tandem at 50% duty cycle and 260 and 262 likewise operating in tandem in a complementary fashion to 258 and 264 provides for operation close to the resonant frequency with "full" voltage-ratio operation, thus providing a dual-ratio bus-converter implementation. The resonant network is composed of series inductor 266 (possibly integrated in 270) with capacitor 268, and the magnetising inductance of transformer 270 provides the necessary shunt inductance. Diodes 272 and 274—synchronous rectification can of course be used—operate in a balanced fashion with nominally twice the output voltage applied in the off-period, with capacitor 276 in parallel with load 278 ensuring that stresses are contained, assuming also good coupling between both secondary windings of 270. It will be recognised that no part of the transformer primary winding is "quiet" in this deployment and thus additional shielding requirements in the context of common-mode noise management apply as compared with the conventional LLC converter.

It will be recognised that usage of an LLC bus converter in this fashion with synchronous rectification is optimised if operation occurs close to the series resonant frequency, or indeed just below this frequency so as to allow full zero-current switching of rectifier diodes, and a control scheme to optimise operating conditions with primary side control has been disclosed in a prior application. The timing precision required here is demanding as the operating conditions have to be correct after 3 resonant half-cycles as well as after one resonant half-cycle.

The LLC approach regulates primarily by frequency, with typically low-efficiency conditions associated with other operating modes such as PWM or asymmetric operation. These may be acceptable and necessary under transient conditions such as during start-up. The RMS current in a resonant converter will also be inferior to a converter having a current waveform that is closer to a square wave.

Figure 18B:
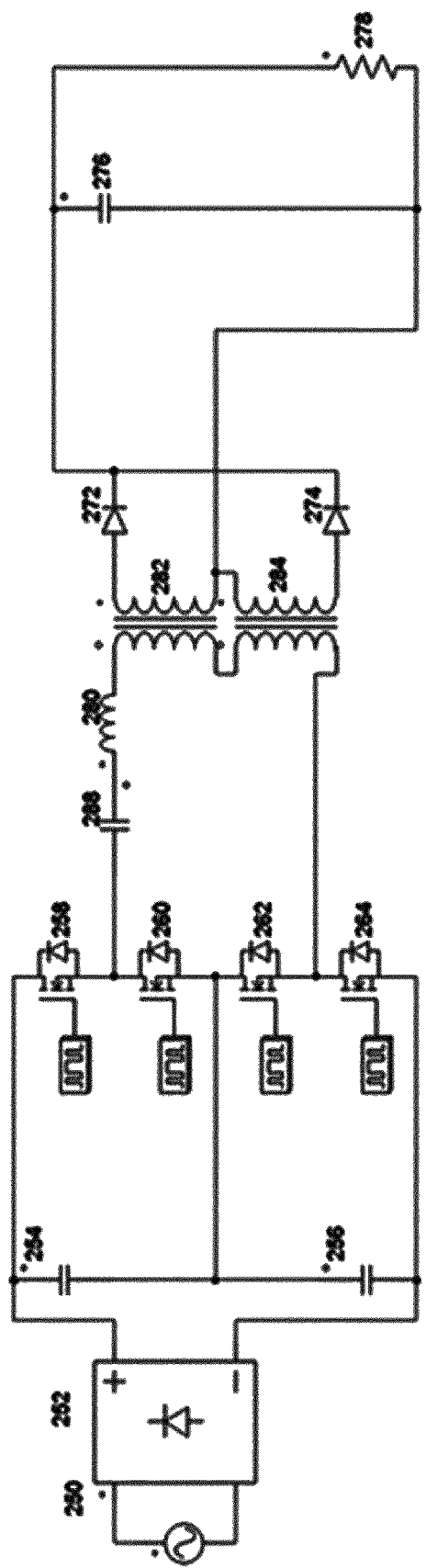

A further aspect of the present application provides a multilevel converter shown in FIG. 18B. The arrangement of FIG. 18B is an attractive dual-ratio bus converter option which may be implemented using the resonant-transition approach. Such converters may have a conventional output structure with an inductor, or alternatively the two-transformer structure as shown allows direct feed into a capacitor in parallel with the load, as shown in FIG. 18B.

By applying a driving approach with switches having similar modulation patterns as applied in the context of holdup extension this again offers the opportunity of high efficiency at two discrete transformation ratios. This converter type is also capable of providing fine-tune voltage control under resonant transition conditions, but at the cost of extra current and voltage stresses in the case of one of the output rectifiers. This controllability may be used to directly effect input current control over some part of the line cycle, thus achieving an element of power factor correction, but the preferred approach at higher power levels can involve usage of such a converter as a dual-ratio bus converter followed by secondary-side current shaping. Usage of asymmetric transformer ratios can also serve to equalise power dissipation between the middle switches and the uppermost/lowermost devices.

Such a converter is shown in FIG. 18B. Here, a small inductor (which may be the aggregate leakage inductance of transformers 282 and 284) drives the requisite resonant transition in both operating modes, with 288 being a blocking capacitor. Waveforms of current in the upper two switches are as has been shown in FIG. 13.

Here the resonant transition is seen as being largely independent of frequency and the RMS characteristic of the current waveform is superior.

The load regulation of a converter of this type with a fixed duty pattern may be inferior to the LLC which can deliver close to flat gain with load, but a modest adjustment range is possible without material additional rectifier stress.

Dual-ratio bus converters of this type may also benefit from some of the start-up approaches as discussed earlier in terms of ensuring capacitor balance. The drive task in such converters is usually different in that one typically needs a controlled deadtime, with adaptation with load.

Power factor correction is an important requirement imposed on power converters, and often the design of this stage to implement this functionality is an inelegant compromise. This results in high-voltage hard-switching operation, and in very large magnetic elements and filtering components. This note describes innovation consistent with optimising this functionality, allowing for reduced losses and for smaller passive components.

It is also to be recognised that the use of conversion modes of differing gain in such converter types can also make them well suited for extending the holdup time of a converter using a conventional electrolytic capacitor as the principal energy storage element.

It is further to be recognised that such converter types allow significant reduction in size of magnetic elements and are thus suited for modular construction implementation.

An advantage of the approaches described herein using a set of switches connected in series for example as shown in FIGS. 3, 4, 5, 9, 12, 18A and 18B is that transistors with reduced switching voltages may be employed.

The multilevel approach generally allows reduction in size of magnetics, particularly in the boost inductor for power factor correction and in filtering components, and the usage of switches with lower voltage ratings also gives materially better reverse recovery characteristics. The flip-side of course is that one needs a lot of switches and associated drivers, which means that significant additional circuit space is required.

This aspect is addressed in part by usage of efficient low-cost drives (as cited in this application) and by usage of low-cost digital control as feasible with microcontroller, FPGA and custom digital control approaches. Indeed, it has been observed that the overall cost is actually comparable at 200V and 600V ratings for comparable power levels—e.g. a 600V device around 250 mR on-resistance is approximately equivalent in pricing to three devices of 200V rating with 90 mR on-resistance and so additional components do not alter the cost significantly.

However, the present inventor has realised that the switching circuits are such that the power switching devices may readily be integrated together on an integrated circuit with a minimum pin (external connection) count yet with the ability to connect to the other elements of the switching circuits. The usage of a silicon-on-insulator fabrication approach for the IC with appropriate isolation regions allows a chip to be partitioned into isolated domains, each of which can house a switch and possibly its associated drive circuitry. The approach has a further advantage in that a common issue with usage of high-voltage integrated approaches relates to the requisite voltage spacing between pins—whereas now one can have output or input pin groupings with a requirement for perhaps 150V-200V isolation rather than the 400V as would be required in a two-level approach, thus being more closely aligned with industry-standard pin spacings and minimising the need for usage missing-pin lead frame and package structures in achieving the required voltage spacing.

More specifically, usage of a multilevel approach as for example described above requires a number of switches, typically MOSFETs. In the context of power conversion from conventional universal AC line, typically several devices with voltage ratings between 100V and 250V can be used. For operation as a 4-switch 3-level converter after the bulk capacitor, one can for example use a string of four 250V-rated MOSFETs, with the existing approach (prior art) typically using an upper and lower MOSFET, each with a voltage rating of 500V+. In the case of the power-factor correction "totem-pole" approach, a "string" of six devices each rated at 200V may be optimal, or depending on device characteristics one could use a string of 12 devices each rated at 100V. It will be appreciated that this results in savings of cost and efficiency. It also allows for faster switching frequencies as the witching speed of MOSFETs generally decrease with increasing voltage ratings.

As seen, these approaches convey attractive benefits in terms of reduction of ripple current and an increase in its frequency, minimising reverse recovery losses and allowing reduction in size of bulk capacitance for a given holdup time. To ensure they are economically competitive however requires low-cost implementation of control circuitry, of drives and of the power switch devices themselves.

Low-cost control circuitry is available as a result of advances in digital design, using microcontrollers and FPGA-type devices, as well as custom solutions, that are well placed to generate the drive pulses required. Low-cost, compact drive transformer approaches have been as presented, with advances in PCB and silicon technology expected to be consistent with the ability to integrate these within the same package as the power devices.

The power devices may be considered as "cells", with each cell containing two switches in a half-bridge configuration with complementary drive, or more generally as "strings". The "half-bridge cell" vision is appropriate in multilevel converters where the voltage across the cell is clamped at a submultiple of the input voltage, but usage of flying capacitor techniques means that the elements in the cell differ materially in voltage level.

Implementing a "string" of devices in a linear fashion may be well suited to approaches such as silicon-on-insulator ("SOI") that allow separate voltage domains to be present as "wells" or "pockets" on a single piece of silicon. As compared with a single high-voltage piece of silicon, voltage gradients between elements of the device can be reduced materially. This corresponds also to reduced spacing requirements between pins of the device. Thus, whilst additional interconnect is required as compared with usage of higher-voltage parts, the aggregate size of the die and of the package can be comparable based on this criterion. It will be appreciated that silicon-on-insulator is one suitable method of implementation but other appropriate techniques may be employed to. An example of SOI technology is that of the XT018 process family provided by X-FAB of Erfurt, Germany.

This approach is also well-suited to integration of the source-referenced components (as in FIG. 6) associated with drive of each device, and this approach is shown in FIG. 21. This illustratively shows a four-device structure, which may be all or part of an overall "string", with connections to each source/drain combination and provision also for connections to the drive signals. Optionally, integration also allows ready availability of current sense information and thermal information, which may be multiplexed onto a pin as shown. Current sense information may for example be available as a voltage when the device is "on" and thermal information— for example measurement of a bipolar device $V_{be}$ level— may be available when the device is "off", and this is the functionality of the additional circuit referenced to the source of the lower FET in the string.

Figure 19:
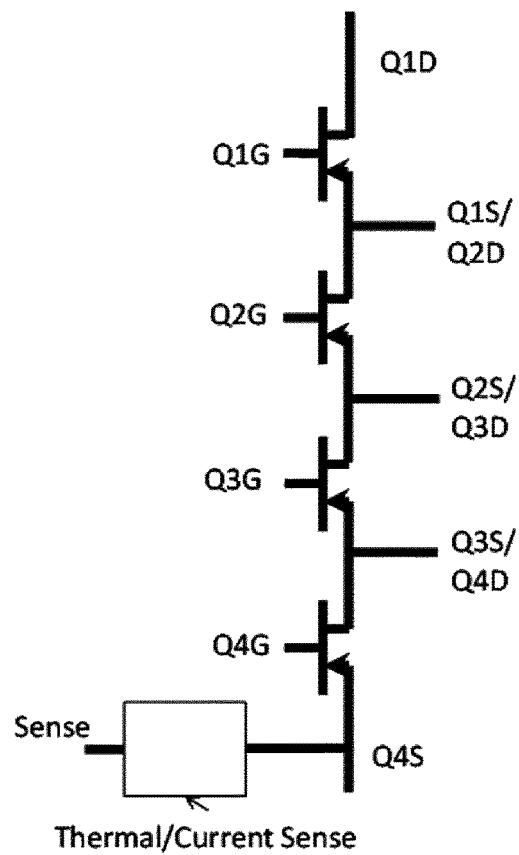
FIG. 19 is a series arrangement of power switching transistors which is suitable for implementation in an integrated circuit for use in a switching power supply and which for example may be employed for the series connected switches shown in the other figures.
Figure 20:
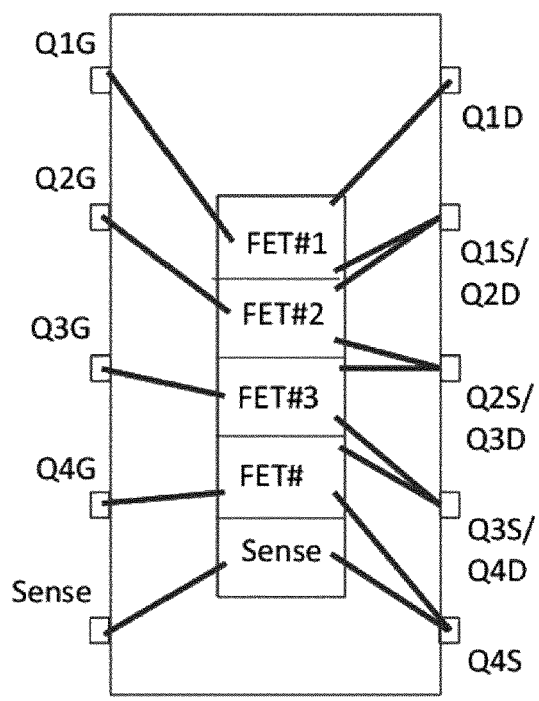
FIG. 20 is a representation of a packaged IC comprising the series arrangement of FIG. 19 with connections to the legs/pads of the IC.

It is recognised that the "boundaries of integration" will be determined by technical and commercial factors applying in particular deployments. Integration could extend to include transformers and driver/control circuitry. Likewise, alternative techniques for provision of gate drive signals and power, possibly using level shift approaches with "bootstrap" techniques, could also be used, in which case a more generic chip approach may be provided as in FIGS. 19 and 20 (with or without a sensing function).

Indeed one alternative approach is to manufacture elements of the circuit in discrete blocks or cells. These alternative approaches may employ silicon integration (for example using SOI approaches) or integration using MOM or PCB-embedding techniques. These cells may be referred as imbricated cells since they may be employed in different parts of the circuit and thus their functionality overlaps between different parts of the circuit. Thus the same tile may be employed in a PFC front end, or a DC-DC stage. The advantage of this approach is that the "cells" may be manufactured as discrete blocks for integration in a larger overall package with larger devices such as the power inductors and capacitors provided separately. Additionally, it allows for a single controller to be used for the overall circuit since each cell is arranged to simply have control inputs as opposed to a discrete controller integrated therewith.

Such an arrangement will now be described in the context of the exemplary control circuit of FIG. 6 for operating complimentary switches which may in turn employ the transformer of FIG. 8. In this arrangement the "stacked" portrayal of switches as for example in FIG. 5A can be redrawn to show this as an arrangement of cells. Here a capacitor is positioned between each cell, and the connections between switches correspond accordingly per FIG. 5A.

Figure 22:
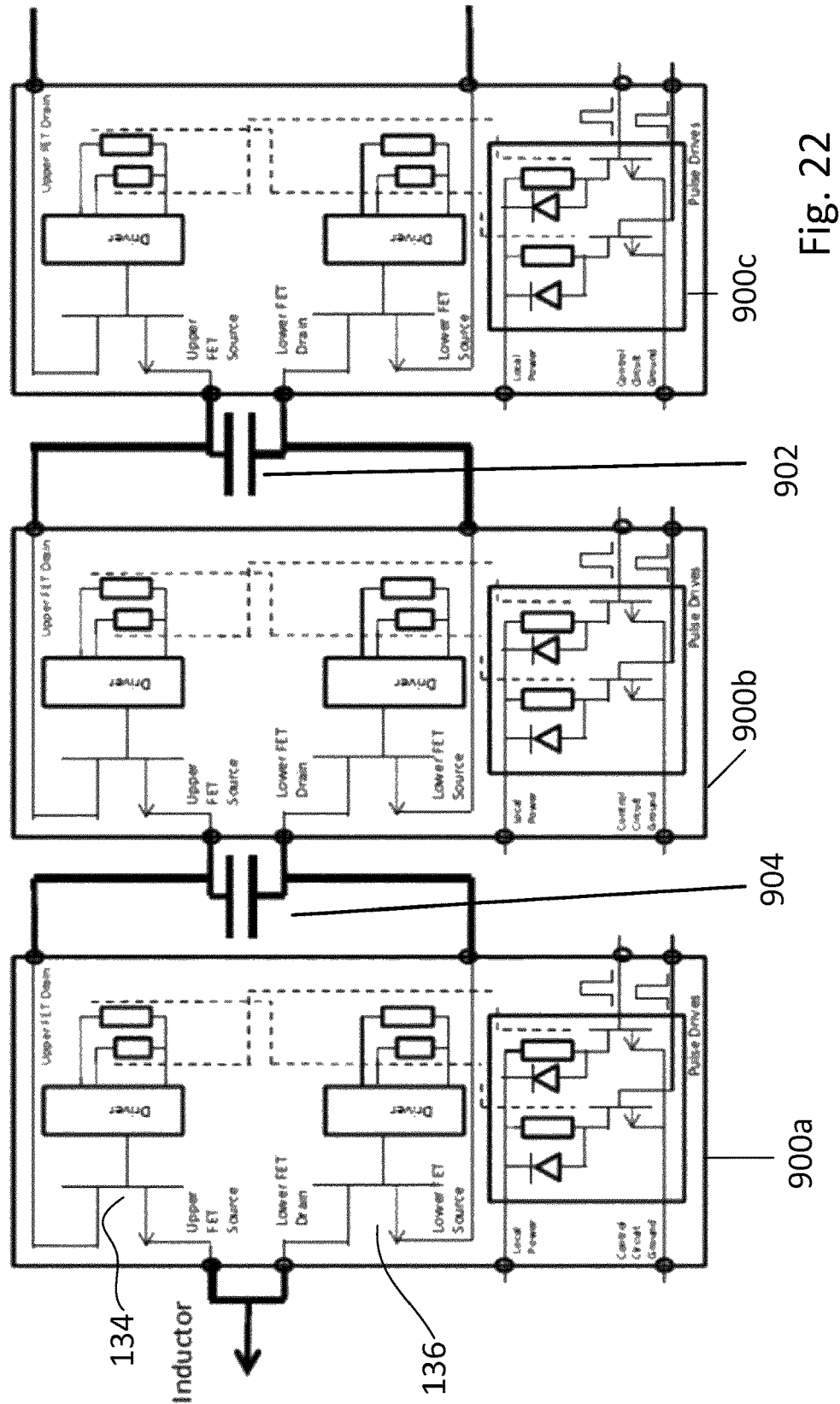
FIG. 22 demonstrates a cell approach to implementation of a converter where the same cell may be employed in in a number of places (three cells are shown) in the converter, as an example it may be employed to part implement the converter of FIG. 5 with switches 134, 136 implemented in element 900a, capacitor 144 implemented as capacitor 904, switches 132 and 138 implemented in 900b and capacitor 146 implemented as capacitor 902, switches 130 and 140 implemented in 900c, the exemplary cell approach combines power switching transistors with drive circuits and so may use the drive circuit of FIG. 6 and may employ the transformer of 8 which be an embedded or at least partially embedded component in circuit board material when the cell is formed using printed circuit board techniques.
Figure 22A:
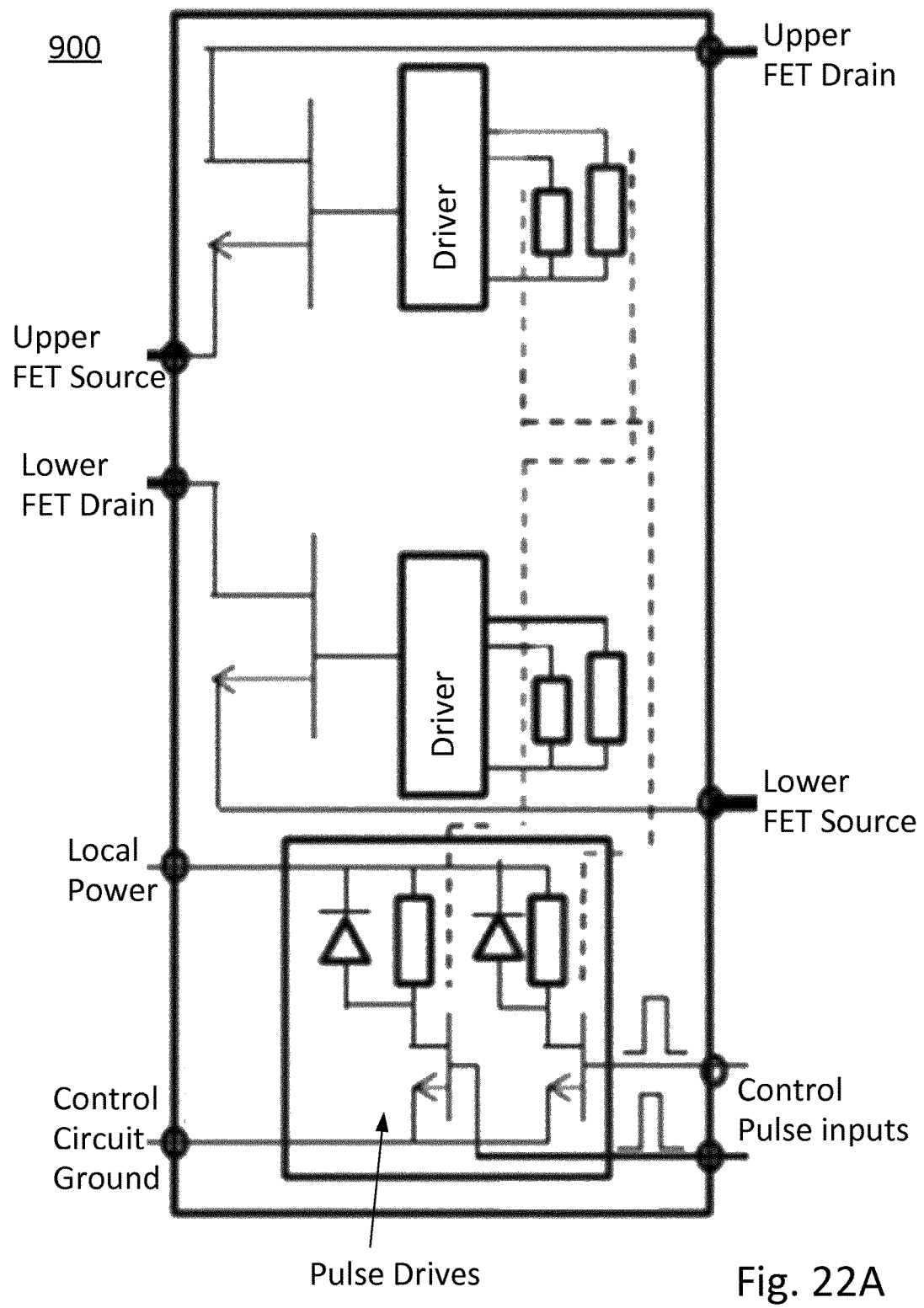
FIG. 22A shows a cell of the type shown in FIG. 22.
Figure 23:
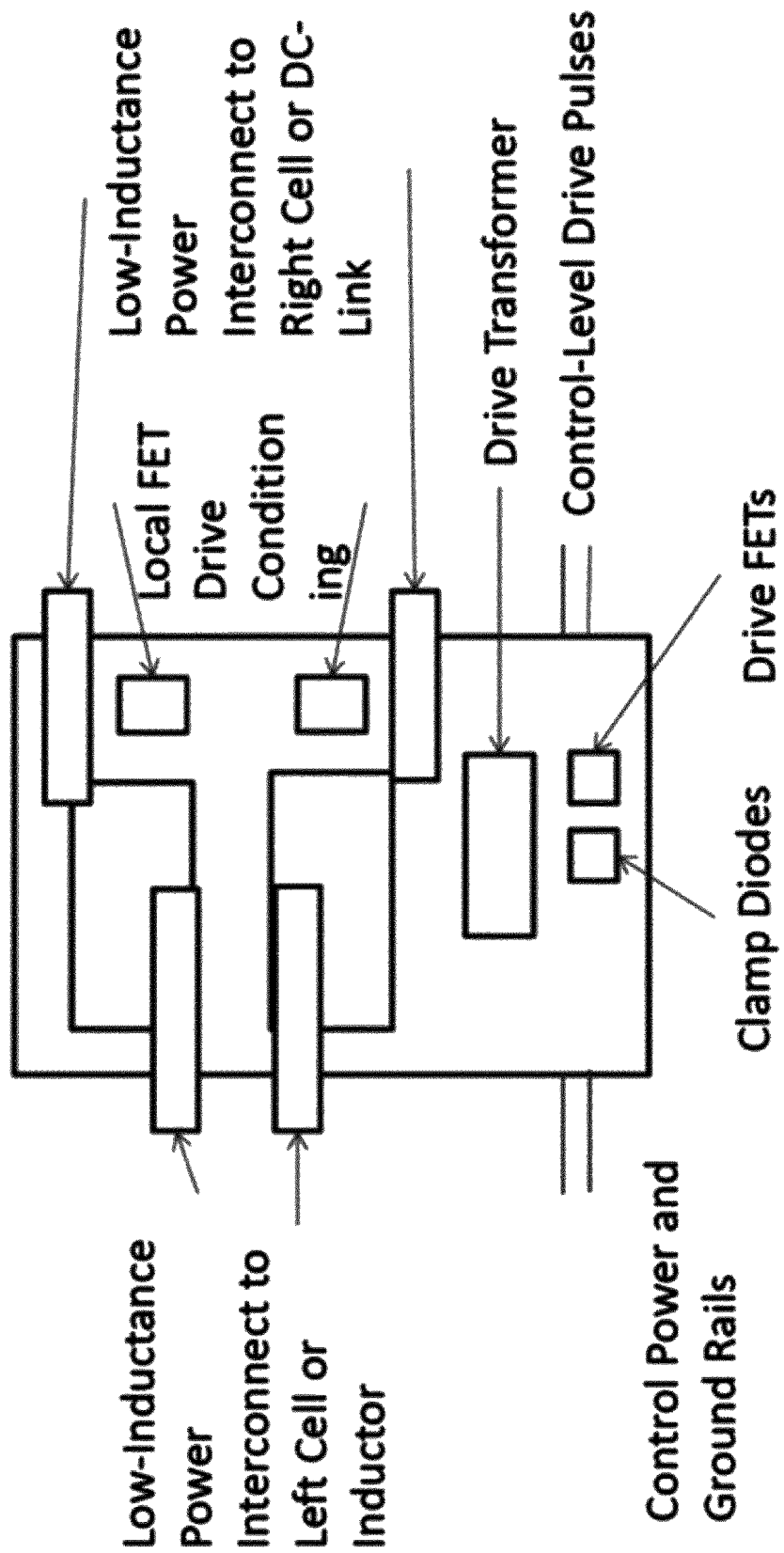
FIG. 23 is an exemplary layout for such a cell as it might be laid out when constructed using printed circuit board techniques and highlights exemplary external connections which may be provided as legs or surface mount contacts to allow for mounting of the cell directly as a component onto the circuit board of a switching power supply.

The "cell" approach is then as shown in FIG. 22. Here it seen that a capacitor is placed between cells, with the leftmost cell defaulting to a connection on the left to the inductor and the rightmost cell defaulting to a connection on the right typically to the DC-link Within each cell one has the pair of power switches along with drive circuitry.

By using the complementary drive transformer as discussed in the context of FIG. 6 this can allow particularly compact implementation without the need for bootstrap-type local drive-power feed, as the drive edge turn-on pulse power is directly fed from the drive transformer winding.

In the foregoing specification, aspects have been described with reference to specific exemplary circuits, methods and structures. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present apparatus is, for the most part, composed of electronic components and circuits known to those skilled in the art, circuit details will not be explained in any greater extent than that considered necessary as illustrated above, for the understanding and appreciation of the underlying concepts of the present application and in order not to obfuscate or distract from the teachings of the present invention. It will be understood that whilst particular polarity devices, e.g. PMOS, NMOS, PNP or NPN may be illustrated in the figures, that alternative polarity devices may be employed by appropriate modification of the circuits.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations.

Moreover, alternative embodiments may include multiple instances of a particular operation, and the order of operations may be altered in various other embodiments. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A power-factor correction switching power converter for converting an AC input voltage to a DC output voltage, wherein the switching power converter is configured as a bridgeless totem pole boost topology having an inductor which is switched to an output capacitor, wherein the switching power converter comprises:
   a first input node;
   a second input node, wherein the AC input voltage is provided across the first and second input nodes;
   a first output node;
   a second output node, wherein the output capacitor is connected across the first and second output nodes;
   a first switching device, wherein the first switching device switchably connects the first input node to the first output node; and
   a second switching device, wherein the second switching device switchably connects the first input node to the second output node,
   wherein the totem pole topology comprises a multi-level switching arrangement having a plurality of switches arranged in series and having an intermediate node in the plurality of switches, wherein the inductor is electrically connected at a first side to the second input node and electrically connected at a second side to the intermediate node and wherein the plurality of switches comprise a first switch and a second switch connected in series and positioned between the intermediate node and the first output node and a third and fourth switch provided between the second output node and the intermediate node, wherein the multilevel switching arrangement further comprises a first capacitor connected between a common node of the first and second switches and a common node of the third and fourth switches.

2. The switching converter according to claim 1, wherein the bridgeless totem pole topology is provided as a power-factor-correction (PFC) stage in a power supply.

3. The switching converter according to claim 1, wherein the plurality of switches includes diodes.

4. The switching converter according to claim 1, wherein the plurality of switches includes thyristors.

5. The switching converter according to claim 1, wherein the multi-level switching arrangement is designed to have an operating voltage that is less than 300 Volts.

6. The switching converter according to claim 1, wherein the plurality of switches includes at least four switches.

7. The switching converter according to claim 1, wherein the multi-level switching arrangement comprises flying capacitors.

8. The switching converter according to claim 7, further comprising a switched initialization circuit for initializing the voltages across the flying capacitors.

9. The switching converter according to claim 1, wherein the multi-level switching arrangement comprises a plurality of diode clamped capacitors in series.

10. The switching converter according to claim 1, further comprising a clamping circuit for clamping the voltages in the multi-level switching circuit to limit stresses on individual switches within the multi-level switching circuit.

11. The switching converter according to claim 1, wherein the plurality of switches in the series further comprise a fifth switch connected between the second switch and the intermediate node and a sixth switch connected between the third switch and the intermediate node, wherein a second capacitor is provided between the node common between the fifth and second switches and the node between the sixth and third switches.

12. A switching power converter configured in a bridgeless totem pole boost topology having an inductor which is switched to an output capacitor, wherein the totem pole topology comprises a multi-level switching arrangement, wherein the switching power converter comprises:
a first input node and a second input node;
a first output node and a second output node, wherein the output capacitor is connected across the first and second output nodes, wherein a first switching device connects the first input node to the first output node and a second switching device connects the first input node to the second output node, and wherein the multilevel switching arrangement comprises:
a plurality of switches arranged in series, wherein the inductor is connected at a first side to the second input node and at a second side to an intermediate node in the plurality of switches of the multilevel switching arrangement; and
a clamping circuit for clamping the voltages in the multi-level switching arrangement to limit stresses on individual switches within the multi-level switching arrangement, wherein the clamping circuit comprises a ladder arrangement connected in parallel with the output capacitor, the ladder arrangement comprising a plurality of capacitors connected in series in combination with a corresponding plurality of zener diodes connected in series with each intermediate node in the series of capacitors connected by a connecting component to a corresponding node in the series of zener diodes and where the intermediate nodes are connected through diodes to nodes in the multi-level switching circuit.

13. The switching converter as in claim 12, where the connecting components have a zero ohm effective resistance.

14. The switching converter according to claim 13, wherein a switching converter input is connected across one or more of the plurality of capacitors.

15. The switching power converter of claim 12, wherein the plurality of switches includes diodes.

16. The switching power converter of claim 12, wherein the plurality of switches includes thyristors.

17. The switching power converter of claim 12, wherein the multi-level switching arrangement is designed to have an operating voltage that is less than 300 Volts.

18. The switching power converter of claim 12, wherein the plurality of switches includes at least four switches.

19. The switching power converter of claim 12, wherein a switching converter input is connected across one or more of the plurality of capacitors.

20. A switching power converter configured in a bridgeless totem pole boost topology having an inductor which is switched to an output capacitor, wherein the totem pole topology comprises a multi-level switching arrangement,
wherein the multi-level switching arrangement comprises flying capacitors, wherein the switching power converter further includes a switched initialization circuit for initializing the voltages across the flying capacitors, wherein the initialization circuit comprises a series resistor string coupled to the output capacitor, and wherein intermediate nodes of the resistor string are switchably connected to nodes within the multi-level arrangement to allow initialization of voltages on the flying capacitors.

21. The switching power converter of claim 20, wherein the switching power supply converter is an AC-DC converter.

22. The switching power converter of claim 20, wherein the multi-level switching arrangement is designed to have an operating voltage that is less than 300 Volts.

23. An integrated circuit for use in a switching power supply, the integrated circuit comprising:
a plurality of external connections;
a plurality of at least four FET type transistors, each transistor having a gate, a source and a drain, wherein the FET type transistors are arranged in series such that the source of a first transistor in the series is connected to the drain of the second transistor in the series at a common node between the two transistors and the common node is presented at an external connection, wherein each individual FET has a maximum operating voltage of at least 600V divided by the number of FETS in the series; and
a plurality of driver circuits, each driver circuit providing a control signal to the gate of a respective FET transistor wherein each driver circuit has two inputs, a first input for receiving a signal to switch on a transistor and a second input for receiving a signal to switch off a transistor, wherein the plurality of driver circuits is arranged in a complementary fashion so that when a first transistor is being switched on by a first driver circuit a second transistor is being switched off by a second driver circuit.

* * * * *